July 17, 1951    L. H. MORSE    2,561,030
SHEET FEEDING APPARATUS
Filed April 2, 1947    14 Sheets-Sheet 1

INVENTOR
LAWRENCE H. MORSE
By Bates, Teare & McKee
ATTORNEYS

July 17, 1951

L. H. MORSE 2,561,030

SHEET FEEDING APPARATUS

Filed April 2, 1947

INVENTOR
LAWRENCE H. MORSE
By Bates, Teare, v M<sup>c</sup>Jown
ATTORNEYS

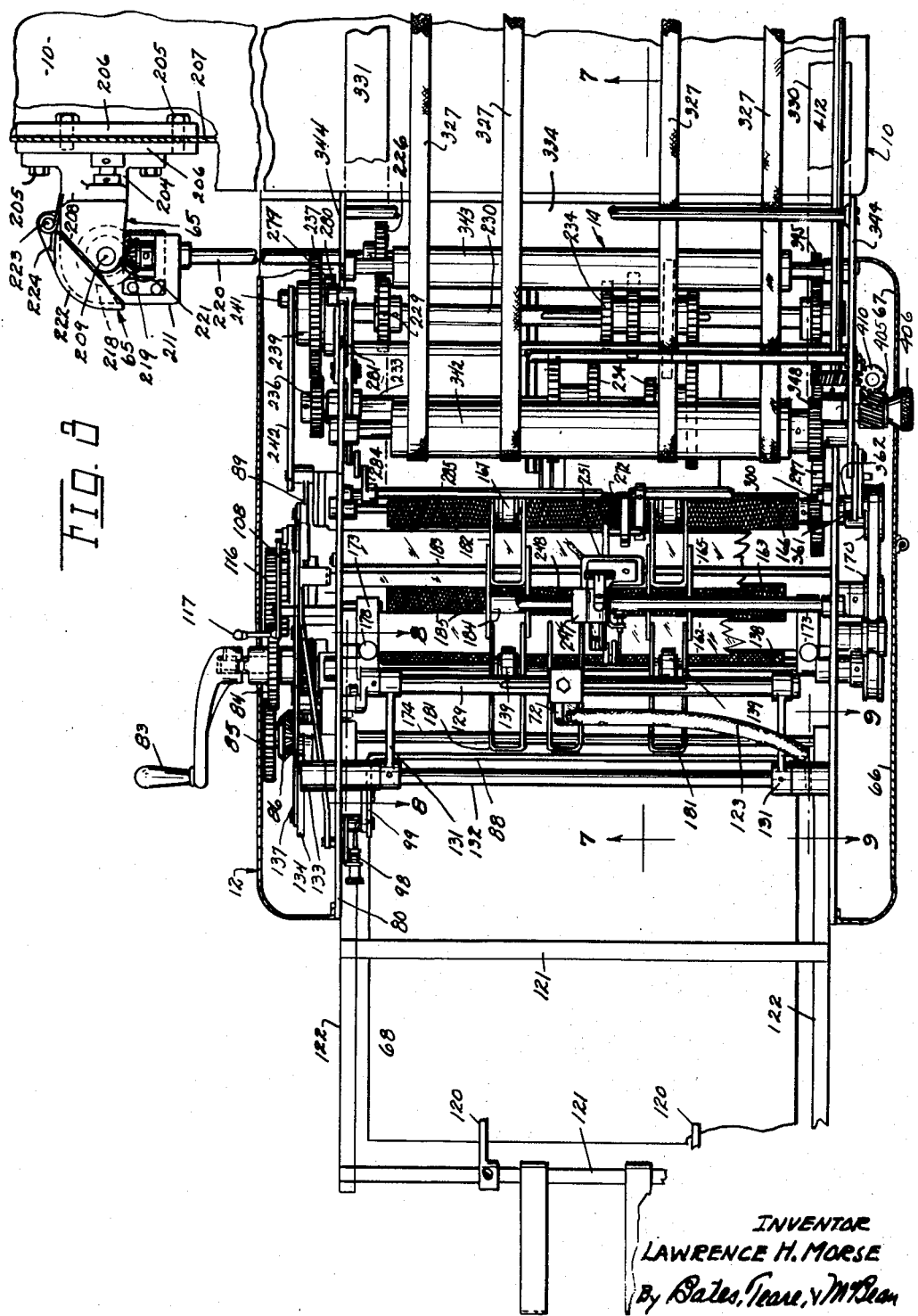

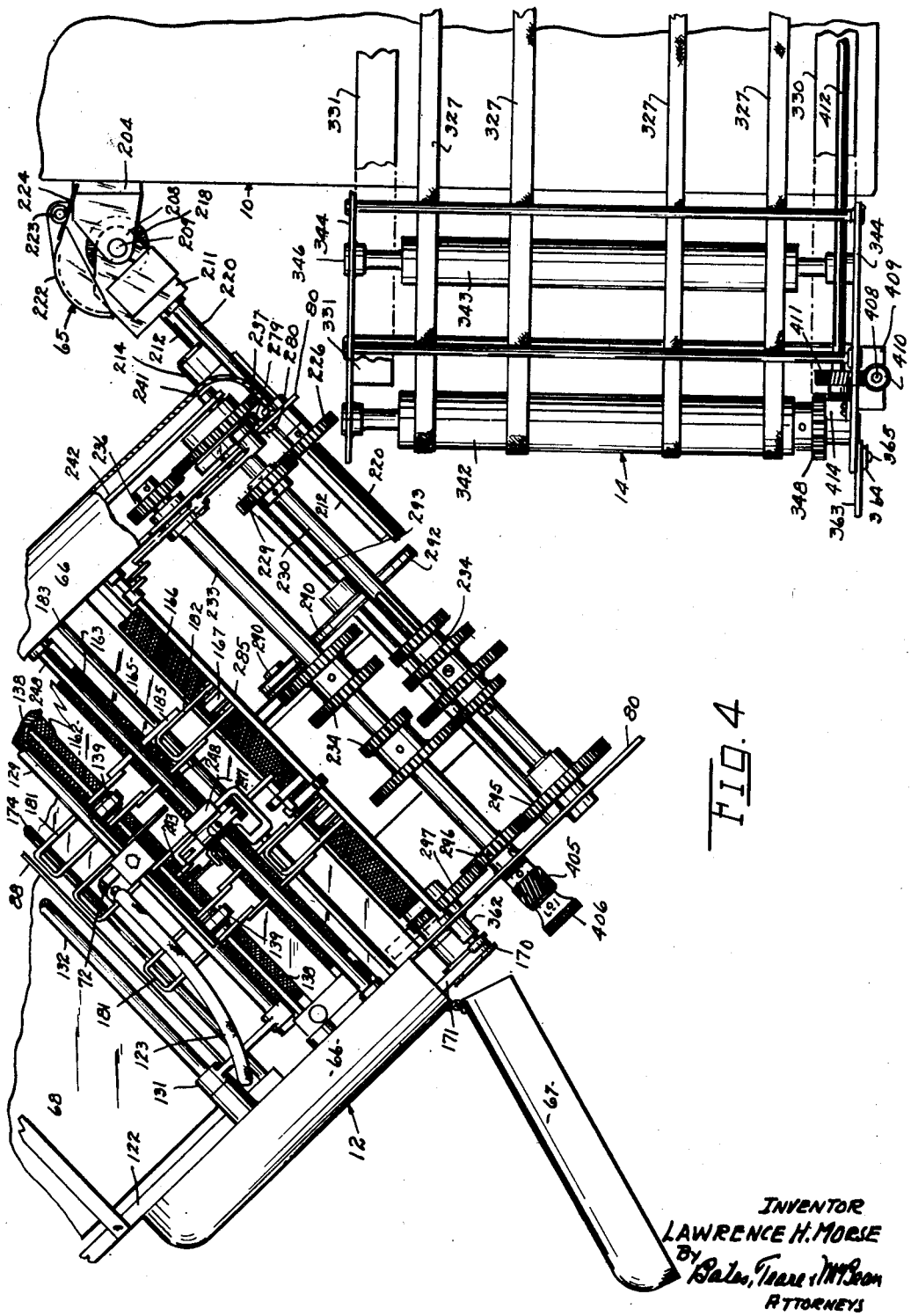

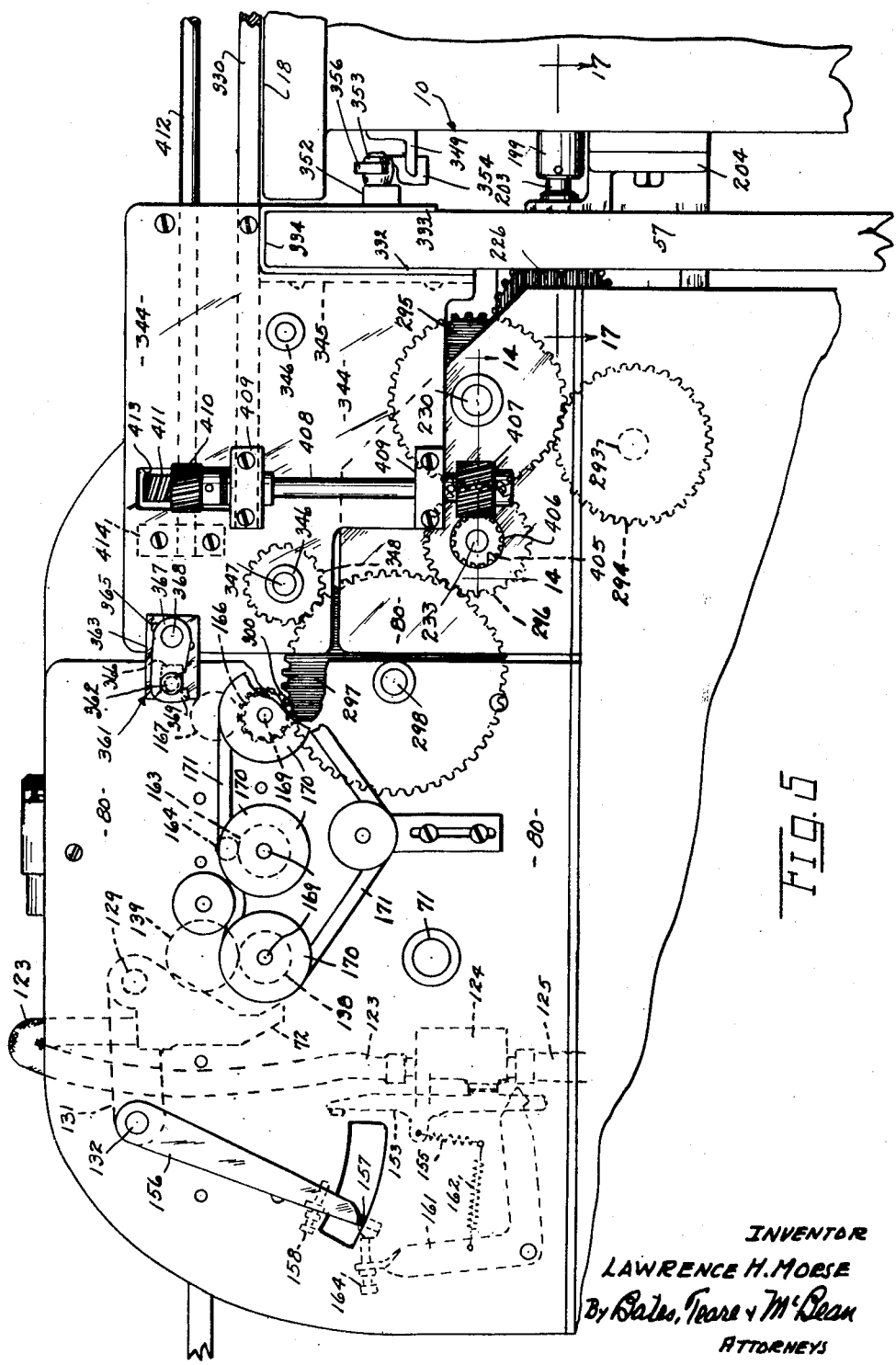

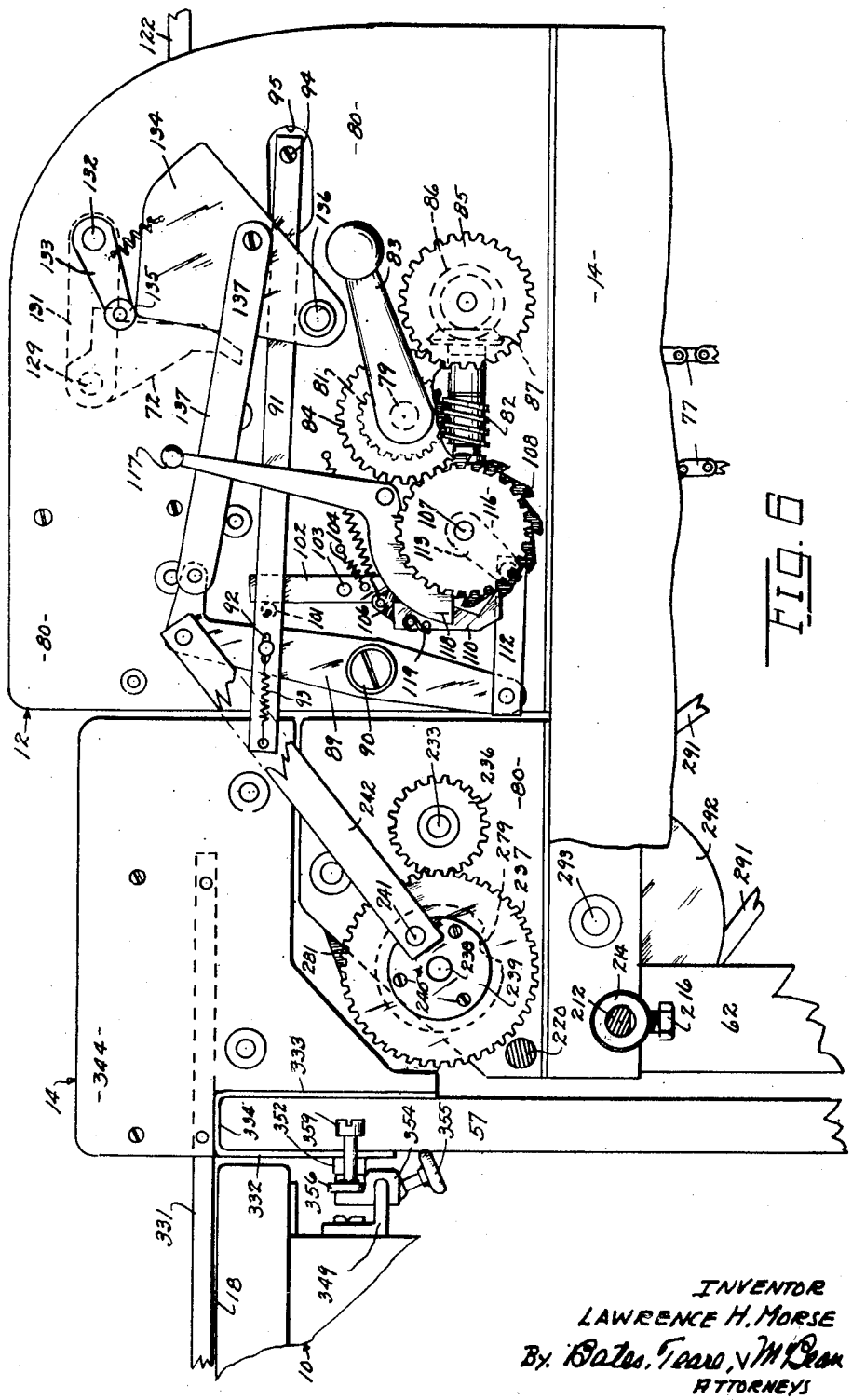

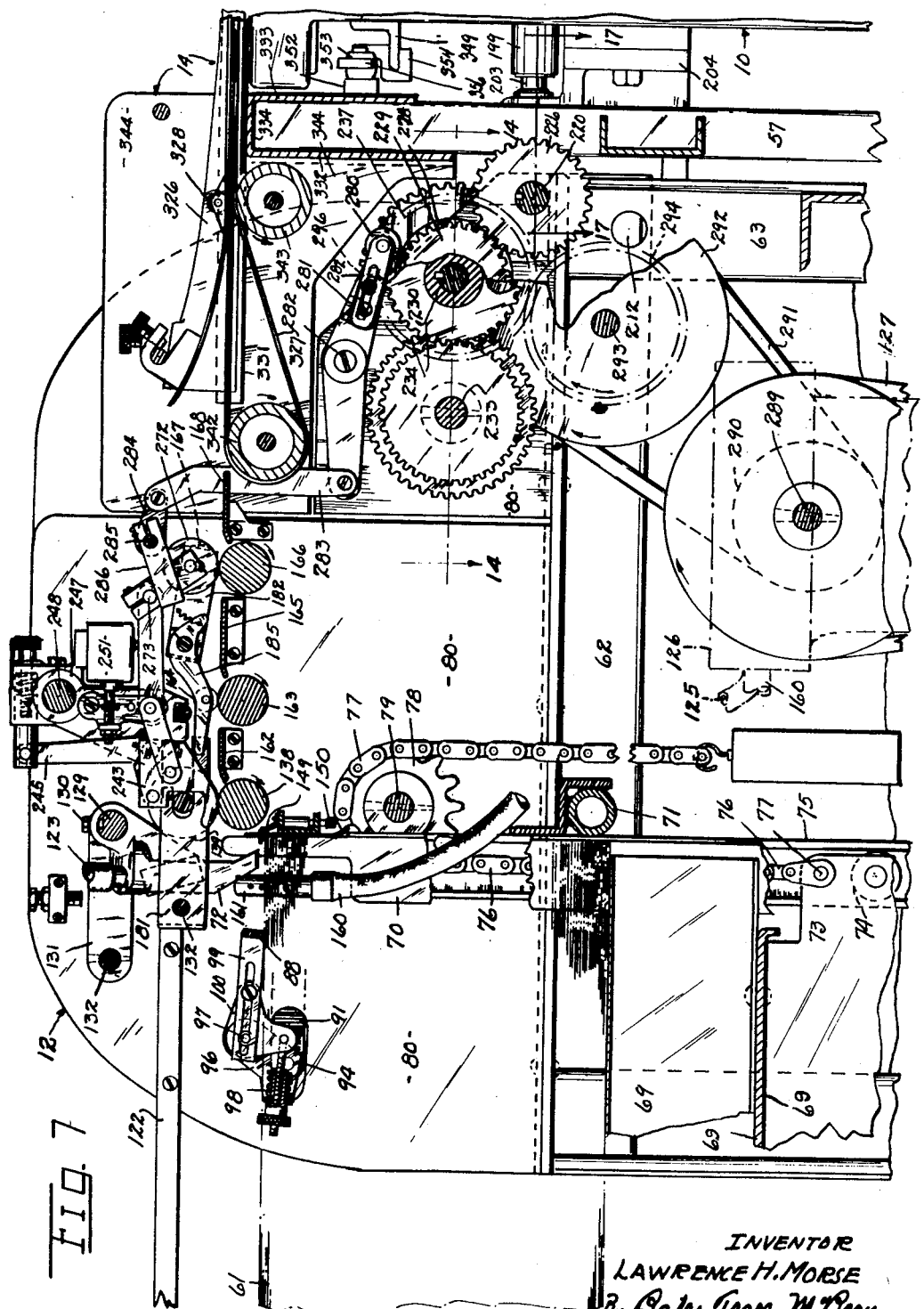

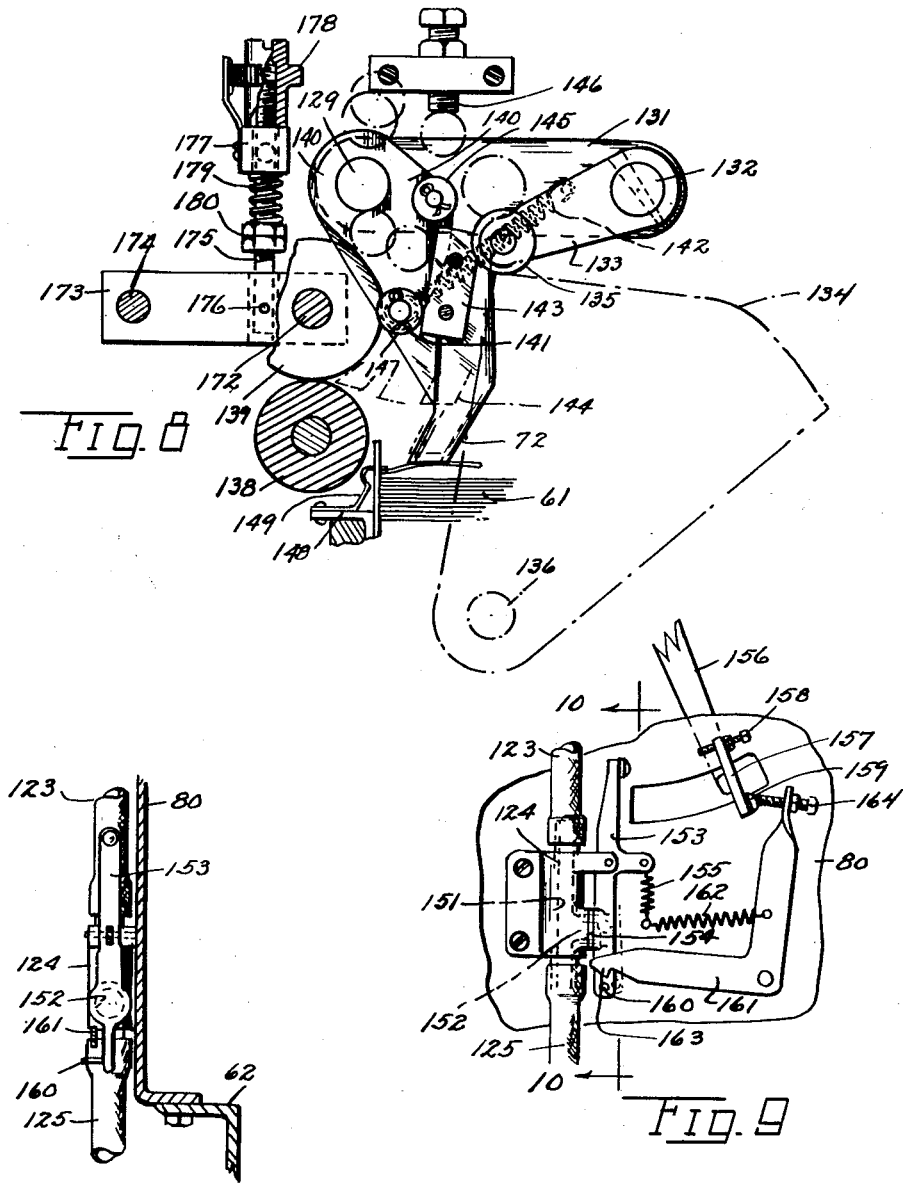

July 17, 1951 L. H. MORSE 2,561,030
SHEET FEEDING APPARATUS
Filed April 2, 1947 14 Sheets-Sheet 9
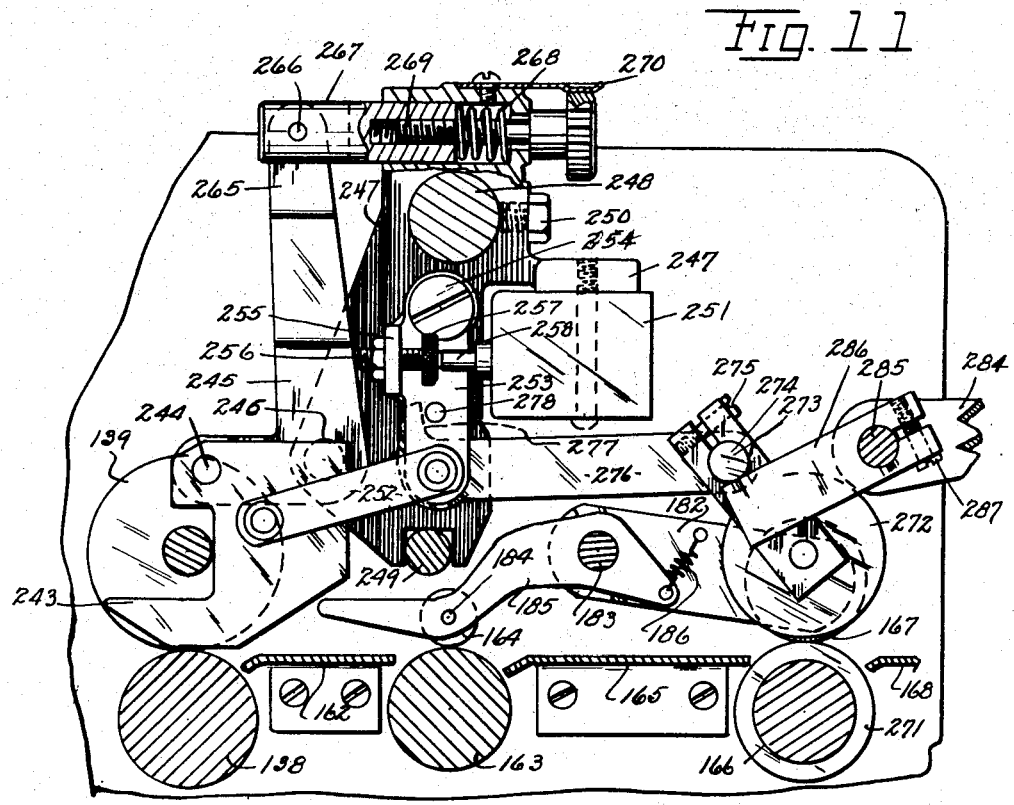
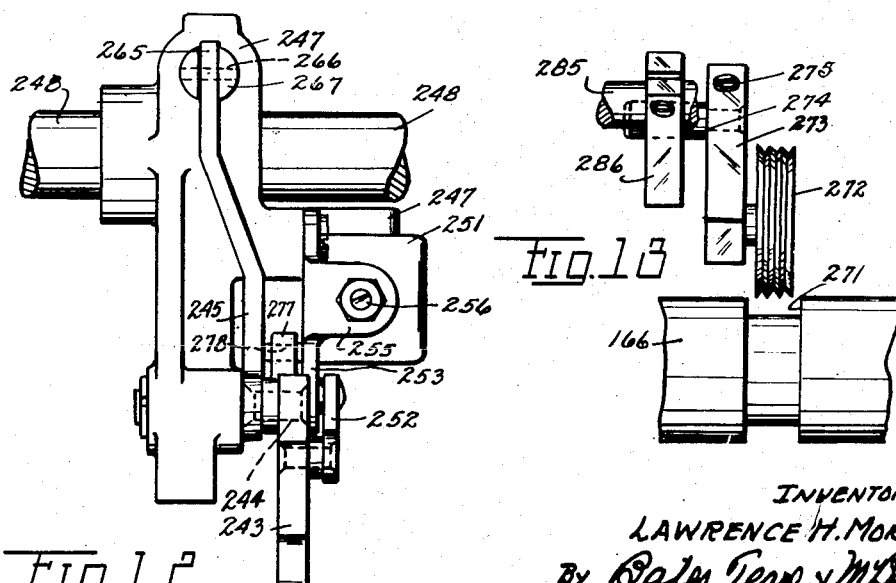
INVENTOR
LAWRENCE H. MORSE
BY Bates, Teare, & McLean
ATTORNEYS July 17, 1951 — L. H. MORSE — 2,561,030
SHEET FEEDING APPARATUS
Filed April 2, 1947 — 14 Sheets-Sheet 10
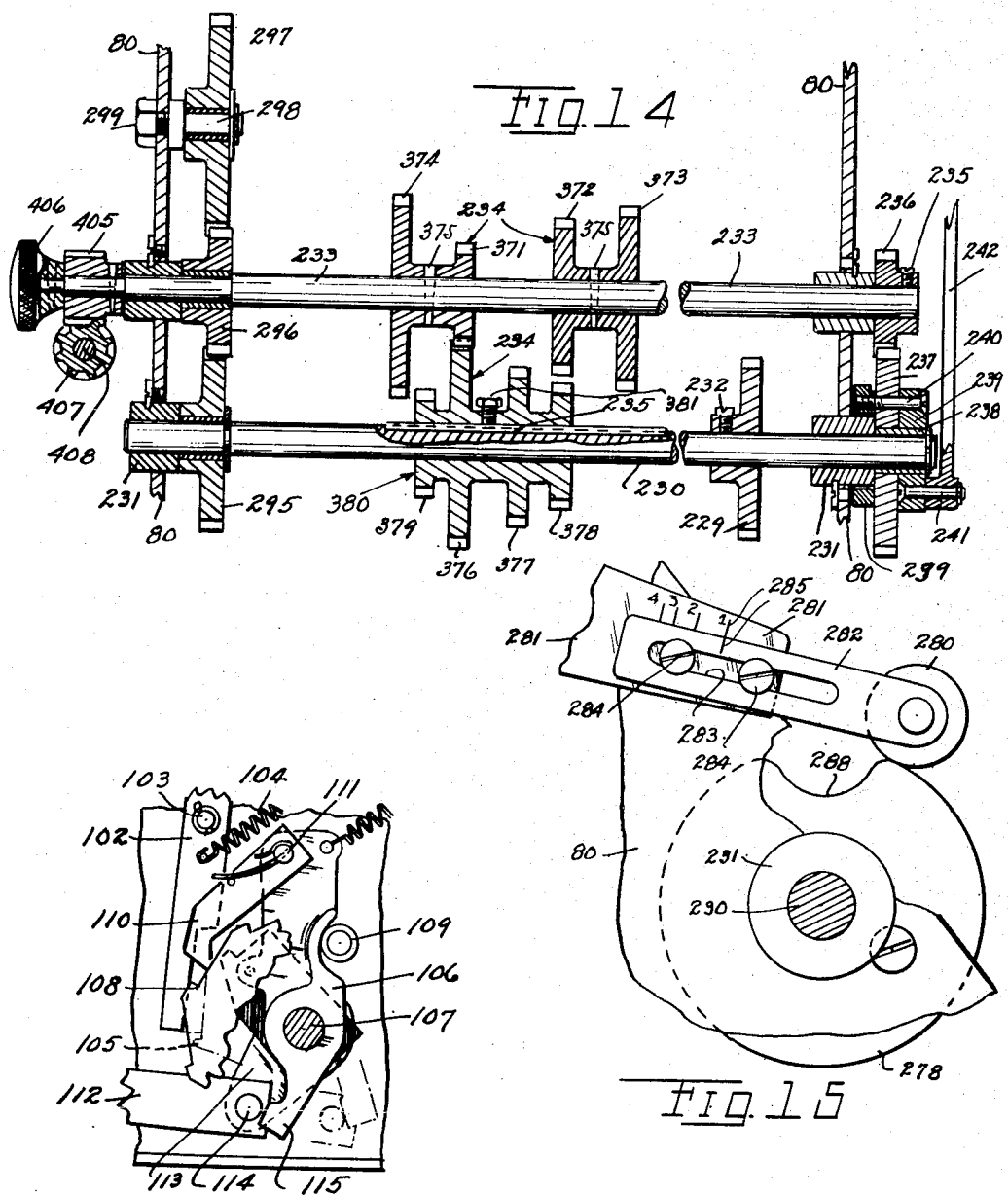
INVENTOR
LAWRENCE H. MORSE
By Bates, Teare & McBean
ATTORNEYS July 17, 1951

L. H. MORSE 2,561,030

SHEET FEEDING APPARATUS

Filed April 2, 1947

INVENTOR
LAWRENCE H. MORSE
By Bates, Teare, & McBean
ATTORNEYS

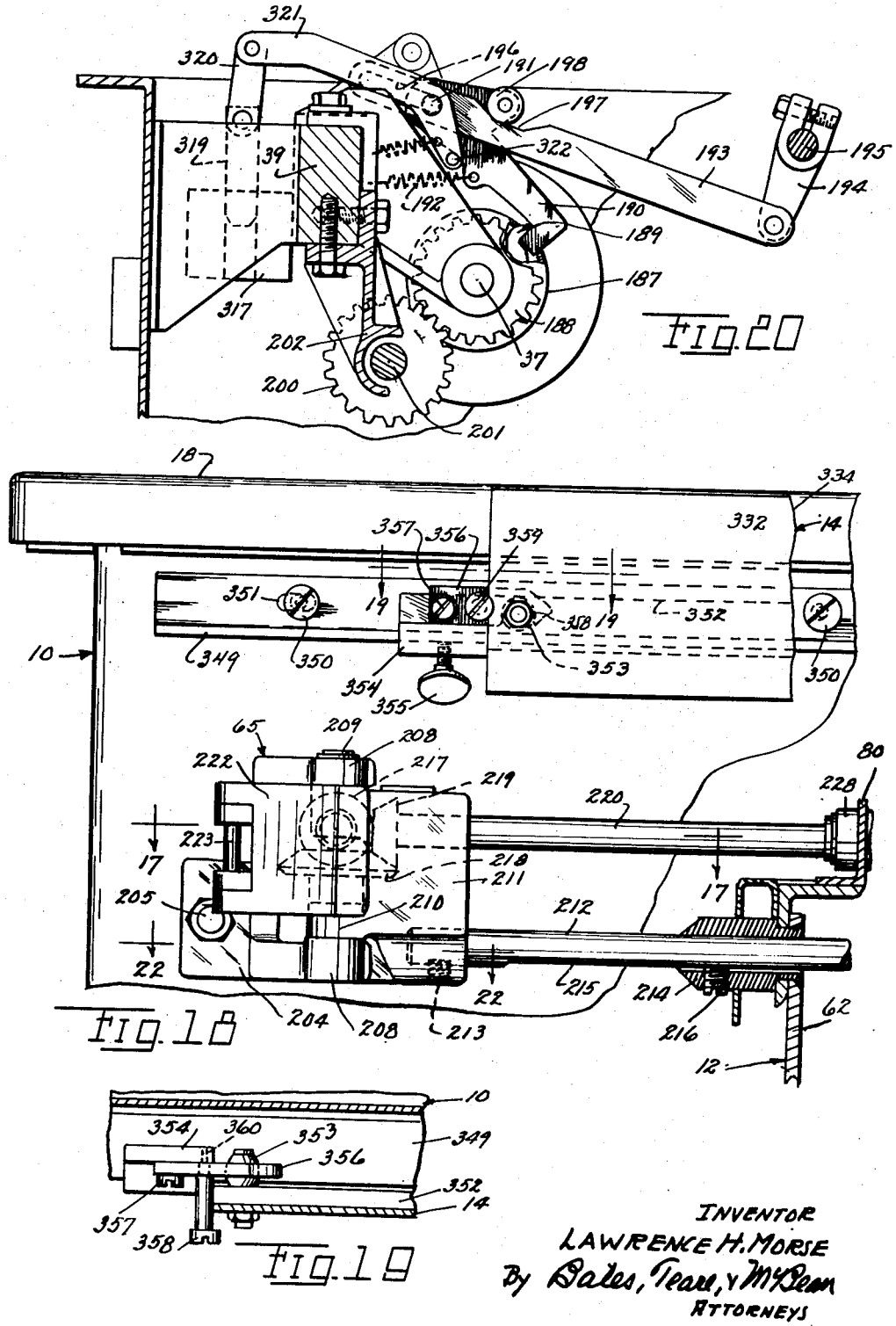

July 17, 1951  L. H. MORSE  2,561,030
SHEET FEEDING APPARATUS
Filed April 2, 1947  14 Sheets-Sheet 13
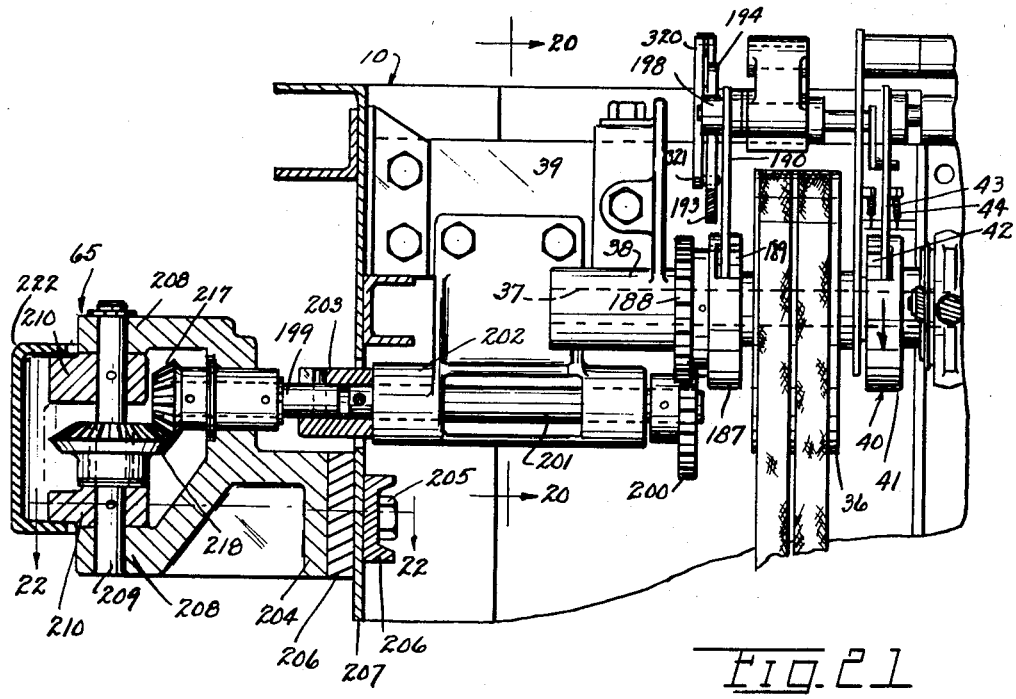
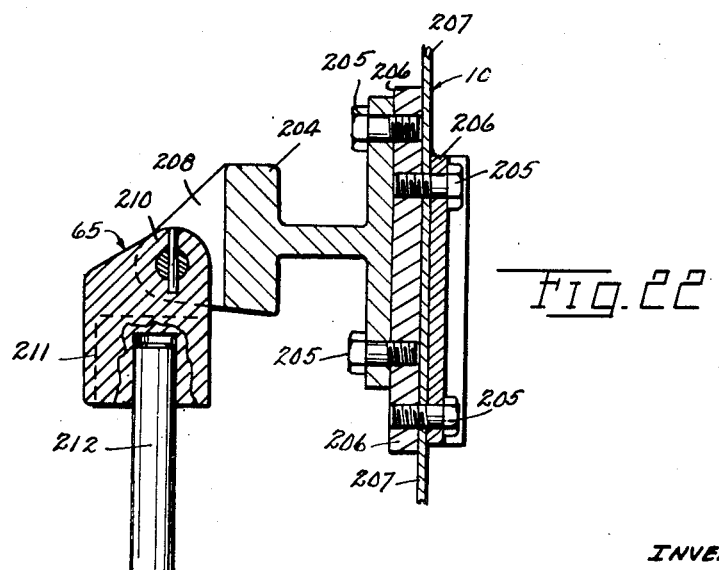
INVENTOR
LAWRENCE H. MORSE
By Bates, Teare, & McBean
ATTORNEYS July 17, 1951  L. H. MORSE  2,561,030
SHEET FEEDING APPARATUS
Filed April 2, 1947  14 Sheets-Sheet 14
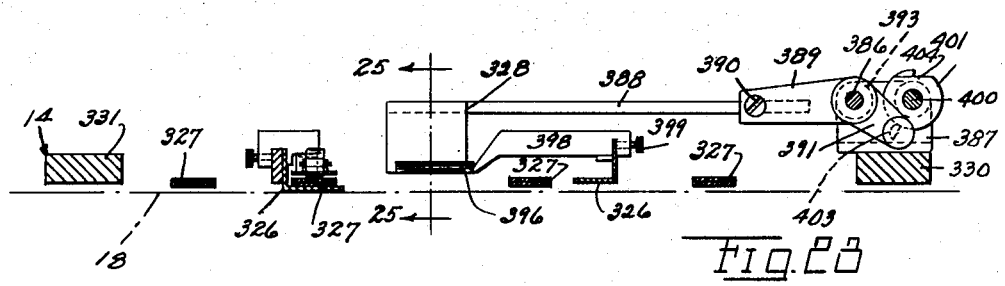
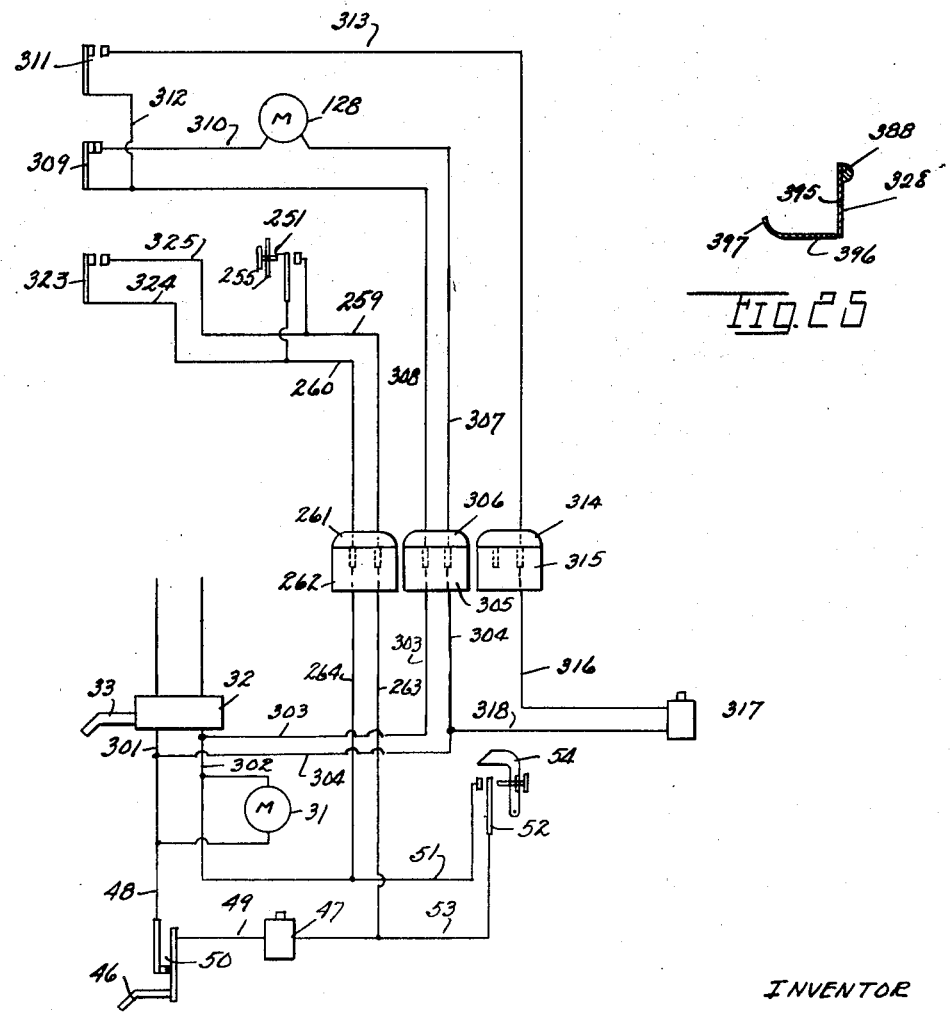
INVENTOR
LAWRENCE H. MORSE
By Bates, Teare y McKean
ATTORNEYS Patented July 17, 1951

2,561,030

UNITED STATES PATENT OFFICE 2,561,030

SHEET FEEDING APPARATUS

Lawrence H. Morse, Mentor, Ohio, assignor to Addressograph-Multigraph Corporation, Cleveland, Ohio, a corporation of Delaware Application April 2, 1947, Serial No. 738,842

10 Claims. (Cl. 271—3)

This invention relates to improvements in printing machines of the type through which a plurality of individual printing devices are fed one at a time to printing position where one or more impressions are made from the devices. More particularly the present invention relates to improvements in the automatic feeding of sheets, forms, pamphlets and the like, to printing position to have one or more impressions made thereon from individual printing devices. These, therefore, are the general objects of the present invention.

Printing machines of the general type with which the present invention is concerned, are employed in business establishments for addressing mailing matter, printing various business, accounting, shop, tax and other forms, as well as for imprinting checks, tags, and other matter. At times it is desirable to use such machines for high speed production of printed matter over extended periods of time; at other times it is desirable to use the machine for relatively low speed operations on specialized work.

For high speed production it is desirable that the work pieces be automatically fed to the machine at high speed and with utmost accuracy, whereas for low speed specialized operations it is often desirable that the automatic feeding be dispensed with and the work pieces manually placed in printing position. At times it is desirable to interrupt high speed production of a relatively lengthy task for brief periods of time to enable the production of such specialized work.

Automatic sheet feeding mechanisms have been provided for use with such machines. However, it has been found exceedingly difficult to provide and associate an automatic sheet feeding mechanism with such printing machines, so that work pieces may be automatically fed to printing position at high speed and with the high degree of accuracy required, both as to correlating the timing of the feed with the timing of the printing mechanism and as to accurately positioning the work sheets relative to the printing positions. These difficulties are increased by the wide variations in sheet sizes for different tasks, by the desire of the user to position the imprint over a wide variation of positions on the sheet, and by the desire to interrupt lengthy high speed operations for brief periods of manual operation, and then to resume the high speed automatic operations without requiring readjustment and retiming of the mechanisms. Accordingly it is an object to provide a mechanism which will overcome these difficulties.

In Morse Patent 2,359,852, issued October 10, 1944, there is disclosed a printing and automatic feeding mechanism similar in some respects to that of the present invention. Such patent includes a sheet separating mechanism carried by and at one end of a bridge-like open-top structure which spans the table top of the printing position and which carries a sheet advancing and control mechanism to advance the sheets to printing position and to determine the location of the impression or impressions on the sheets, and after the desired impressions have been made, to advance the sheets to a collector means at the other end of the structure. This bridge-like structure is movable bodily into and out of position relative to the printing machine and when entirely separated from the printing mechanism enables the manual feed operations desired.

While the mechanism of Patent 2,359,852 possesses many highly desirable features it still does not result in the full use of the printing machine as desired. For instance, regardless of the precision of the coupling devices between the separating and feeding mechanisms, and the printing mechanisms, it has been found difficult to move the feeding mechanism bodily away from the printing mechanism to interrupt the automatic operation for a brief interval and then replace the feeding mechanism to resume automatic operation, without some readjustment or some variation between the position of the impressions, and without retiming the mechanisms. The present invention overcomes these difficulties.

Sheet separating and feeding mechanism have been subjected to many improvements and some are comparatively accurate and reliable. However, it is well known that one sheet of paper may vary slightly from another in the same stack. These variations may be relatively small; however they are sometimes of such a nature as to cause the work to jam in the feeding mechanism, or between the separating and feeding mechanisms. Similarly, sheets at times adhere one to the other, with a somewhat similar result. Such conditions require the stopping of the feeding and printing mechanism, and at times result in the clogging of the separating and feeding mechanism by the faulty sheet or sheets.

To facilitate the clearing of undesired sheets from the feeding mechanism, as well as to enlarge the use to which the printing machine may be put, the present invention contemplates the provision of an automatic sheet feeding and separating mechanism which not only may be separated as a unit and moved away from the printing mechanism without disturbing the various adjustments of the separating and feeding mechanism, but also which has provision for moving a portion of these mechanisms, as for instance, the sheet separating mechanism, away from the balance of such mechanism without disturbing the relation of that portion of the feeding mechanism which coacts with the imprinting means at printing position and without disengagement of the operating mechanism interconnecting the printing machine and sheet separating means or the timed relationship between the various mechanisms. Accordingly, this is a more specific object of the present invention.

Other objects and advantages of the present invention will become more apparent from the following description, reference being made to one form of the invention which is illustrated in the accompanying drawings, the novel features of the invention being summarized in the claims.

In the drawings:

Fig. 2 is a plan view of the printing machine and feeding mechanism of Fig. 1;

Fig. 3 is a plan view, on an enlarged scale, of a sheet separating mechanism and portions of sheet advancing, printing and interconnecting mechanisms, the covers being broken away to more clearly illustrate internal constructions;

Fig. 4 is a plan view, similar to Fig. 3, but illustrating the sheet separating mechanism in a different position;

Fig. 5 is an enlarged front elevational view of the mechanism illustrated in Fig. 3, with the front cover removed to illustrate details of construction;

Fig. 6 is a rear elevational view of the mechanism illustrated in Fig. 3, with the rear cover removed to show certain operating mechanisms, the scale of the view being substantially the same as that of Fig. 5;

Fig. 7 is a longitudinally extending vertical section through the mechanism illustrated in Fig. 3, the plane of the section being indicated by the lines 7—7 on Figs. 2 and 3;

Fig. 8 is an enlarged sectional view, illustrating a pneumatic sheet separating mechanism, the plane of the section being indicated by the lines 8—8 of Fig. 3;

Fig. 9 is a detail of a pneumatic control mechanism for the mechanism shown in Fig. 8, the location of the figure being approximately indicated by the lines 9—9 on Fig. 3;

Fig. 10 is a sectional detail, the plane of the section being indicated by the lines 10—10 of Fig. 9;

Fig. 11 is a sectional detail taken in substantially the same plane as Fig. 7, but on a greatly enlarged scale, illustrating mechanisms for detecting the presence of superimposed sheets and for detecting the failure of the mechanism to feed a sheet at the proper time interval;

Fig. 12 is a detail view looking at the left hand side of the detecting mechanism of Fig. 11;

Fig. 13 is a detail view looking at the right hand side of Fig. 11 and illustrating a portion of the mechanism for detecting a failure of the sheet feed;

Fig. 14 is a sectional detail through a portion of a driving mechanism for the sheet feed and separator, and particularly through a change speed gear mechanism used to determine the number of impressions to be made on each sheet or work piece;

Fig. 15 is a detail of a cam mechanism for controlling the operation of the pneumatic separating mechanism and for timing the mechanism for detecting the failure of the feeding mechanism to feed a sheet or work piece;

Fig. 16 is an enlarged detail of a portion of a mechanism used to maintain a substantially constant level of the top of the stack from which the work is being removed piece by piece;

Fig. 18 is a fragmentary vertical transverse section illustrating certain connections between the feeding and printing mechanisms, the plane of the section being indicated by the lines 18—18 on Fig. 17;

Fig. 19 is a fragmentary vertical section taken along the line 19—19 of Fig. 18;

Fig. 20 is a fragmental sectional view taken along the lines 20—20 of Figs. 17 and 21;

Fig. 21 is a fragmental sectional view, the plane of the section being indicated by the line 21—21 of Fig. 17;

Fig. 22 is a sectional detail through a pivotal connection between the feeder and printing mechanisms, the plane of the section being indicated by the lines 21—21 of Fig. 18;

Fig. 23 is a transverse section through the feeder guide frame and associated mechanism, and illustrates certain work stop mechanisms, the plane of the section being indicated by the lines 23—23 of Fig. 2; and Fig. 24 is a schematic wiring diagram illustrating the relationships of various control elements embodied in the machine; and Fig. 25 is a section on line 25—25 on Fig. 23.

Figure 1:
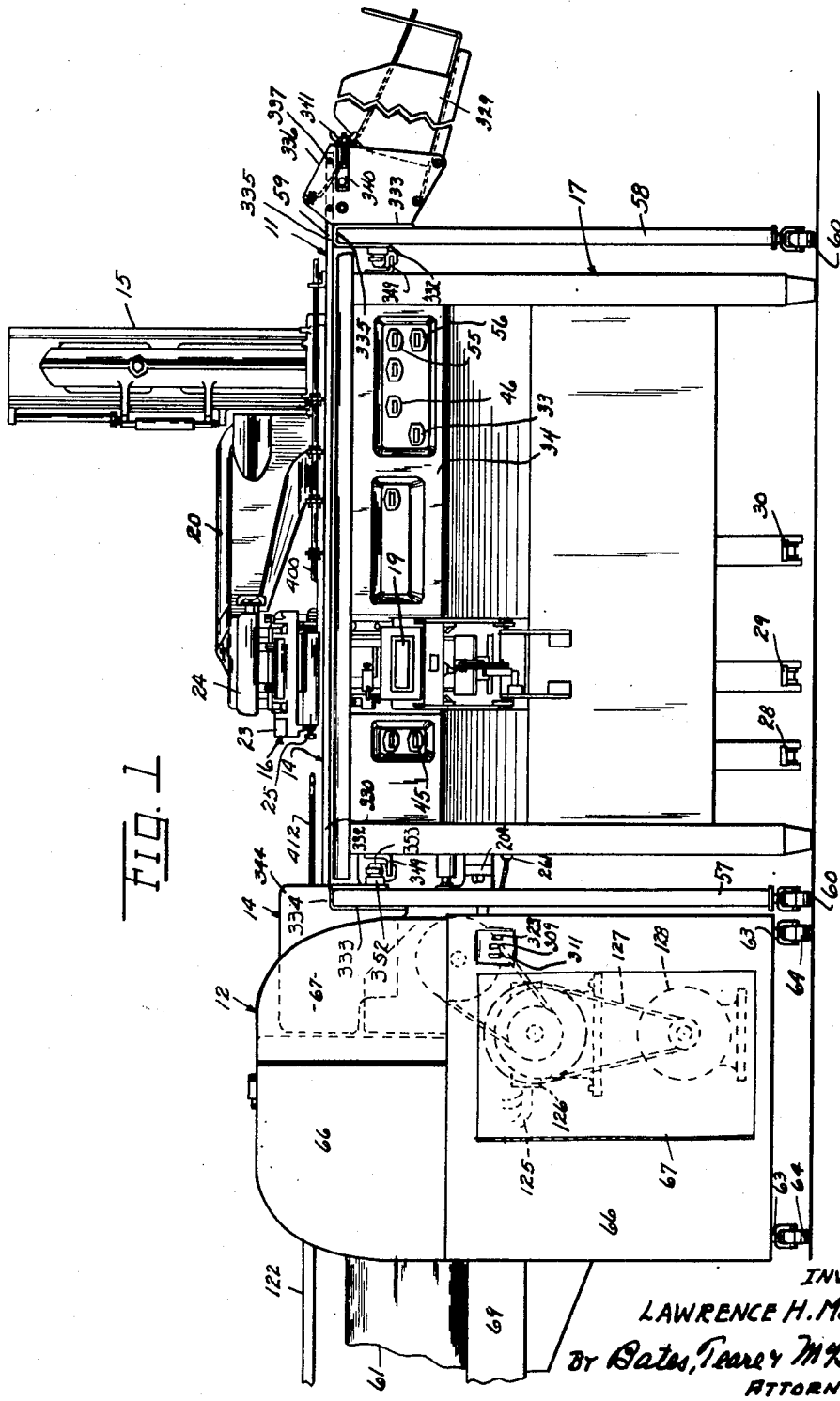
Fig. 1 is a front elevational view of a printing machine equipped for the automatic feeding of sheets and the like according to the present invention.

The present invention is illustrated as incorporating a printing mechanism 10, and a sheet feeding mechanism 11, the latter including a sheet separating mechanism 12 and a sheet advancing and controlling mechanism 14, all of which are so constructed and related that the sheet feeding mechanism may be readily placed in an operative association with the printing mechanism to facilitate high speed production, or may be quickly and easily removed from such operative association to permit manual operation of the printing machine for relatively slow specialized work. Furthermore, the sheet separating mechanism may be quickly moved out of association with the sheet advancing mechanism, and the latter easily removed from association with the printing machine, both the sheet advancing and separating mechanisms being quickly and easily returned to their operative positions for accurate correlated operation with the printing machine.

The sheet separating and advancing mechanisms 12 and 14 are arranged for the feeding of various shaped and sized work pieces, as well as to cause the impressions to be made in various positions on such work pieces. To this end these mechanisms are provided with various adjustments. Likewise various interconnecting and adjustable controls are provided to insure synchronous operation of the separating mechanism 12, the advancing mechanism 14 and the printing mechanism 10, certain of these being disposed between the printing machine and the sheet separating mechanism 12 of the feeder 11.

In the present invention, the separating mechanism may be swung away from the cooperative position relative to the printing machine and sheet advancing means without disconnecting the control and operating mechanism interconnecting the printing machine and the sheet separating mechanism. Likewise after the separating mechanism has been swung away from the printing machine, the sheet advancing means may also be moved out of cooperative relation with both the printing machine and sheet separating mechanism and all may be replaced in cooperating relation without requiring new "set-up" adjustments or retiming of the various mechanisms.

The printing machine

The printing machine 10 is of the type wherein a plurality of individual printing devices each bearing printing means thereon, are advanced one by one from a magazine 15, to a printing station which, in the present instance, lies beneath a platen mechanism 16. The magazine 15 is supported on a printing machine frame 17 which is desk-like in form providing a table top 18 to afford working surface upon which sheets, forms and the like may be supported for the desired printing operations.

The particular form and construction of the printing machine 10 are immaterial, but for purposes of disclosure I have herein illustrated the printing machine 10 as being of the form and construction illustrated in Hueber Patent No. 2,359,850 of October 10, 1944. As disclosed in such patent, the printing devices are advanced one by one from the bottom of the magazine 15 beneath the table top 18, so that each device comes to rest in register with a printing opening which is provided in the table top 18 beneath the platen 16 so as to cooperate with the platen mechanism in defining the printing position of the printing machine. After each printing device has come to rest in printing position it is moved therefrom, discharged, and refiled in a collector means, such as the drawer 19.

The printing devices employed in the printing machine may be of many different types, but the printing machine shown herein is particularly adapted for the use of printing devices of the character disclosed, for example, in Gollwitzer Patent No. 2,132,412 of October 11, 1938. However, the invention may also be utilized with various other types of printing machines, such as for instance, with printing machines which employ printing devices of the character comprising a frame enclosing a thin sheet of stencil paper or the like.

In the printing machine herein illustrated, the platen mechanism 16 is supported in an operative relationship above the table top by a printing frame 20, the specific construction of which forms the subject matter of Hueber Patent No. 2,275,439 of March 10, 1942. The printing frame 20 projects upwardly from the table top, at a point located a considerable distance rearwardly and to the right of the printing position, and extends in a forward direction toward printing position at an angle of substantially 45° with respect to the forward edge 21 of the table top 18.

The magazine 15 is located just to the right of the vertically extending portion of the printing frame 20, and the printing devices are advanced along a relatively complex path beneath the table top 18 to printing position, as disclosed in the aforesaid Patent 2,359,850. The advancing movement of the printing device is accomplished in a step by step manner and is such that each printing device comes to rest at a plurality of different stations along the printing device guideway. The first of these stations comprises a sensing station 22 at which suitable identifying means, such as index tabs carried on the printing devices, may be sensed. The sensed presence or absence of selected identifying means on the printing device at sensing station 22 may be rendered effective to control the operation of the platen mechanism 16 when the printing device from which the sensed identification is derived reaches printing position, and the means employed in the present printing machine for accomplishing this result are fully disclosed in Hueber Patent No. 2,359,851 of October 10, 1944. Reference may be had to such patent for a disclosure of one form of selector means which may be employed in the utilization of the present invention.

The platen mechanism 16 may be any one of a variety of different forms, but is illustrated as being of the form which is incorporated in the printing machine shown in Hueber Patent No. 2,359,850 of October 10, 1944, and is described in detail in Hueber Patent No. 2,359,849 of October 10, 1944. Briefly, the platen mechanism 16 includes a carriage 23 supported for reciprocation from front to rear along tracks provided beneath a head 24 carried on the forward end of the printing frame 20, and a platen roller 25 which is supported on the carriage 23.

The platen roller 25 is disposed in a horizontal position at right angles to the path of reciprocation of the carriage 23, and is supported by means such as toggles so that the platen roller may be shifted from a normal elevated or inactive position to a lower or active position. In its lower or active position the platen roller may be effective to press a sheet or the like into cooperating printing relationship with respect to a printing device disposed at printing position.

The platen mechanism 16, in the form herein disclosed, is arranged so that the platen roller 25 is in its elevated or inactive position when the carriage 23 is in its "at rest" or rearward position shown in Fig. 2 of the drawings. When a printing operation is to be performed, the carriage 23 is actuated through a forward, or idle stroke, by means of actuating mechanism indicated generally at 26. In the course of the forward or idle stroke of the carriage 23, the toggle means which support the platen roller 25 are actuated to shift the platen roller to its lower or active position. This active position of the platen roller 25 is reached at substantially the time when the carriage 23 completes its forward stroke. The platen roller is latched in its lower or active position so that during the return or rearward stroke of the carriage 23, the platen roller 25 may be rolled across the sheet to effect the desired printing operation. Near the end of the rearward stroke of the carriage 23 the platen roller 25 is withdrawn to its elevated or inactive position so that the sheet upon which the printed impression has been made may be removed from printing position and replaced by a new sheet.

In a printing machine, such as the printing machine 10, the various operative cycles of the mechanisms are in most instances initiated by selective manipulation of control means such as a plurality of foot pedals 28, 29 and 30, which are disposed near the floor and beneath the frame 17. These foot pedals serve selectively to initiate different types of single cycle operations of the actuating means which is provided in the printing machine. This actuating means is fully disclosed in Patent 2,359,850, heretofore mentioned, and reference may be had to such patent for the details of structure and operation of such actuating means.

Figure 17:
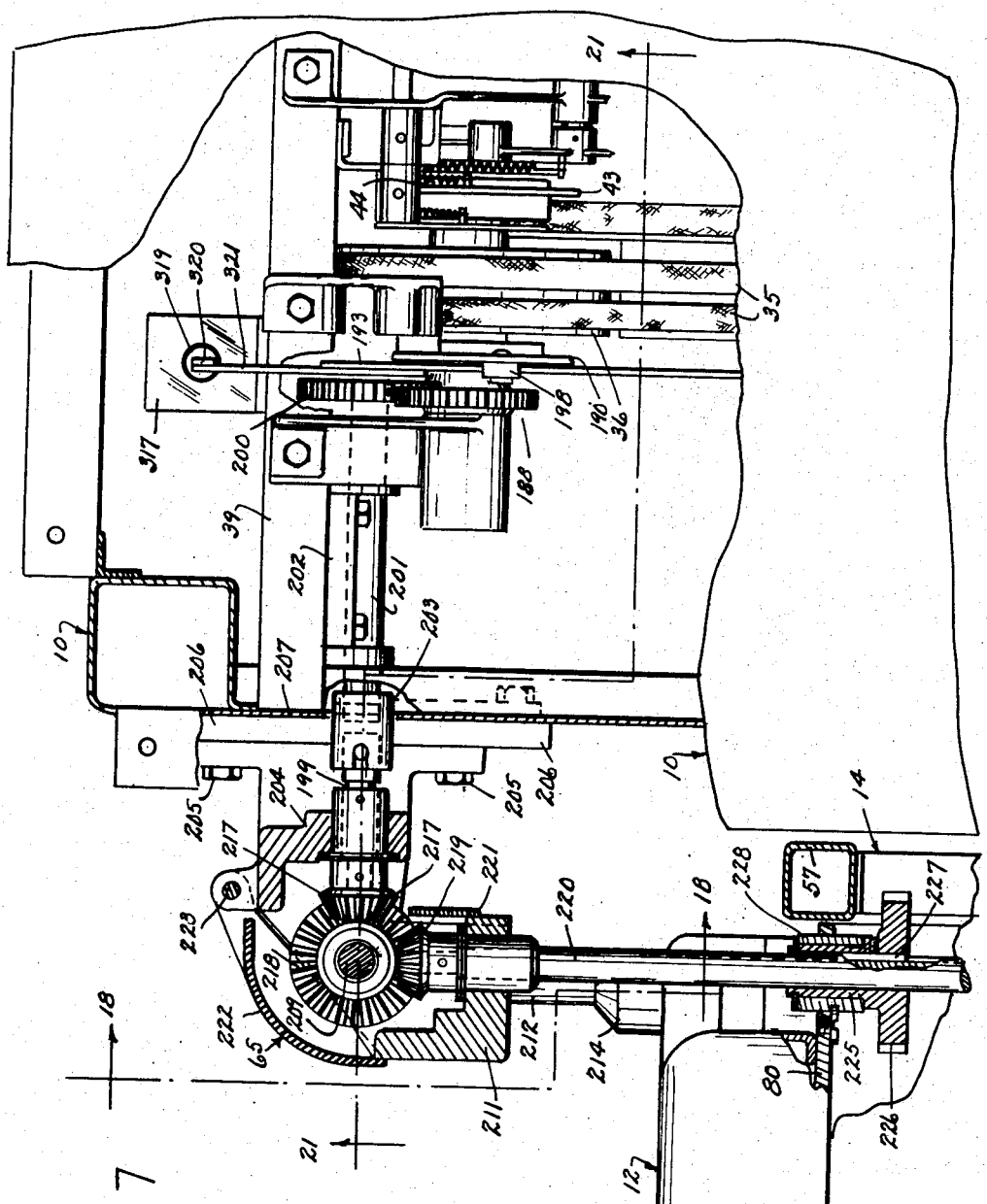
Fig. 17 is a horizontal section through portions of the feeding mechanism, and printing machine, and illustrates a form of positive drive connection for controlling and operating the feeding mechanism in synchronism with the printing mechanism, the plane of the section being indicated by the lines 17—17 on Figs. 5, 7 and 18.

For purposes of the present disclosure it is sufficient to point out that the printing machine 10 has a motor 31 (Fig. 24) which is energized through a switch 32 controlled by a plunger 33 disposed in a recessed forward panel 34 (Fig. 1) of the printing machine frame. The motor 31 serves, through a speed reducing means including a pair of belts 35 (Figs. 17 and 21) to constantly drive a pulley 36. The pulley 36 is mounted on a shaft 37 carried by brackets 38 within the frame 17 of the printing machine. The supporting brackets 38 for the drive shaft 37 are carried by a supporting bar 39 which forms part of the frame 17 and which is disposed beneath the table top 18 near the rear edge thereof as shown in Figs. 17 and 21. The shaft 37 is located in a horizontal position just forwardly and slightly below the supporting bar 39.

As hereinbefore pointed out, the pulley 36 is constantly driven during the use of the printing machine, and runs loosely on the shaft 37. The driving connections from the shaft 37 to the various operative mechanisms of the printing machine are arranged for connection to the shaft 37 and the drive pulley 36 selectively as the several mechanisms are to be operated, and to this end a plurality of clutches are associated with the shaft 37. Only one of these clutches is shown herein. This clutch is what may be termed the master clutch 40 and serves to connect the constantly driven pulley 36 to the shaft 37 to impart rotative movement thereto when required for the actuation of one or more of the operative mechanisms of the machine.

The clutch 40 is fully described in the aforesaid Patent No. 2,359,850. Briefly it is of the one-revolution type, having a driven member 41 fixed to the shaft 37 and carrying a clutch pawl 42. The clutch pawl 42 is normally urged by a spring (not shown) into engagement with a driving member which in the present instance comprises the hub of the pulley 36, and when the pawl 42 is in its operative engaged relation, the driven member 41 is rotated in the direction shown by the arrow in Fig. 21 of the drawings. Such rotation is terminated by a stop lever 43. This lever is urged by a spring 44 into an active position wherein it is engaged by the projecting end of the clutch pawl 42 near the end of the desired one-revolution cycle. The one-revolution cycle is initated by momentary withdrawal of the stop lever 43, thereby releasing the clutch pawl 42 for spring biased movement to its operative engaging relation with respect to the driving hub of the pulley 36.

As described in the aforesaid Patent 2,359,850, the drive shaft 37 has two additional clutches of the same general type mounted thereon. One of these clutches is operative when engaged to cause the printing device feeding means of the printing machine to move through an operative feeding cycle. The other of said clutches is operative, when engaged, to cause the platen operating mechanism to move through an operative printing cycle. The arrangement for control of these clutches is such that whenever the clutch of the printing device feeding means or the clutch of the platen mechanism are engaged, the master clutch 40 is also engaged so as to impart the requisite rotative movement to the drive shaft 37.

The foot pedal 28 (Fig. 1), in the present instance, is arranged to initiate operation of the printing device feeding means only. This foot pedal is sometimes termed the skip pedal in a machine of this character, as it serves to cause a printing device to be fed through printing position without the performance of a printing operation with respect to such printing device. To this end the foot pedal 28 is arranged to cause operative engagement of the master clutch 40 and the printing device feed clutch. The foot pedal 29 is arranged, when it is momentarily depressed, to initiate operation of the platen mechanism only. This foot pedal 29 is often termed the repeat pedal, since it serves to cause repeated printing operation of the platen mechanism while the same printing device remains at printing position. To accomplish this purpose the foot pedal 29 is so arranged that momentary depression of this pedal causes the master clutch 40 and the platen clutch to be engaged, thereby to operate the platen clutch through its operative printing cycle.

The foot pedal 30, when momentarily depressed, causes simultaneous or timed operation of the printing device feeding means and of the platen mechanism 16. Since this operation results in the performance of but a single printing impression from each printing device, the foot pedal 30 is often termed the consecutive pedal of the printing machine. The term consecutive, as applied to the foot pedal 30, is, however, merely a term of convenience since the printing machine 10, as disclosed in Patent No. 2,359,850, embodies means whereby the printing device feeding means may be automatically disabled in certain cycles in a predetermined sequence so that a plurality of printing impressions may be made from each printing device. Such automatic control mechanism may be termed the multiprint mechanism of such a printing mechine, and, in the present machine, is rendered operative or inoperative under the control of a plunger 45 mounted in the recess in the front panel 34 of the printing machine frame. Thus the operation of the multiprint mechanism of the printing machine due to apropriate setting of the control plunger 45, modifies the operation of the consecutive pedal 30.

In the association of the automatic sheet feeding means with the printing machine in accordance with the present invention, use is also made of a means for automatically stopping the operation of the printing machine when certain undesired conditions are detected. This means, which may be termed the auto-stop mechanism of the printing machine, is fully disclosed in Patent 2,359,850 heretofore mentioned. Since reference may be had to such patent for details of construction and operation of the auto-stop mechanism it will suffice for present purposes to point out that the auto-stop mechanism is under the control of a plunger 46 mounted in a recess in the front panel 34 of the printing machine. When the auto-stop control plunger 46 is withdrawn in an outward direction, means is effective to actuate the mechanism associated with the consecutive pedal 30 so as to produce the same controlling result as would follow from continued depression of the foot pedal 30. Thus the platen mechanism and the printing device feeding mechanism will, in the absence of a dominating action of the selector mechanism controlled by the sensing means 22, operate continuously so long as the auto-stop plunger 46 is retained in its withdrawn position.

Means is provided for returning the auto-stop plunger 46 to its inward position, thereby to terminate the continuous operation of the printing machine. As shown diagrammatically in Fig. 24 of the drawings, this means comprises a solenoid 47 which, when energized, is operable to cause inward movement of the plunger 46. The solenoid 47 is arranged so as to be energized whenever an undesirable operating condition is detected by any one of a plurality of detecting means which may be provided in the machine. Thus wires 48 and 49 and an intermediate conditioning switch 50 serve to connect one terminal of the solenoid 47 to one side of the motor circuit between the motor 31 and the control switch 32. The other side of the motor circuit is connected by means of a wire 51 to one terminal of a control switch 52, the other terminal of which is connected to the other terminal of the solenoid 47 by the wire 53.

The switch 52 may, of course, be controlled by any desired detecting means, but as herein shown this switch is governed by a detecting finger 54 which, as disclosed in Patent No. 2,359,850, is arranged to operate as a detecting means associated with the magazine 15 to detect the feeding of the last printing device from the magazine. Thus when the last printing device is fed from the magazine 15 the detecting finger 54 moves through an additional stroke to the left so as to engage one blade of the normally open switch 52 and thereby close this switch.

The normally open conditioning switch 50 is arranged so as to be controlled by the auto-stop plunger 46 so as to be closed when the printing machine is operating continuously under the control of the auto-stop means, and hence when the switch 52 is closed by the detecting finger 45, the solenoid 47 is energized, and the auto-stop plunger is thereby actuated to its innermost position so as to stop the continuous operation of the machine.

As hereinbefore pointed out, the continuous operation of the printing machine under the control of the auto-stop means may be modified in certain instances through the dominating action of the selector mechanism. This mechanism operates under the control of the sensing means 22, and is disclosed in detail in Hueber Patent 2,359,-851 of October 10, 1944. This selector mechanism is rendered active or inactive under control of a plunger 55 disposed in the recessed front panel 34. As pointed out in Patent 2,359,851, the action of the selector mechanism may be varied in certain respects through appropriate setting of a control plunger 56 mounted in the front panel 34. The controlling action of the selector mechanism is such that when the sensed presence or absence of the selected identifying means on a particular printing device indicates that this printing device is to be skipped, the selector mechanism prevents engagement of the platen clutch in the cycle in which this printing device is to reach printing position. This dominating controlling action of the selector mechanism also modifies the action of the machine when the machine is being operated or controlled manually by means of the consecutive foot pedal 30.

*The automatic sheet feeding means generally*

In accord with the present invention the automatic sheet feeding means 11 includes a sheet separator means 12 and a sheet advancing and control means 14. The sheet separator means 12 is constructed and arranged so as to constitute a self-contained unit, and is arranged to swing out of the desired operative relationship with the printing machine and the sheet advancing means 14 without destroying any adjustments or set-up arrangements which have been made in either the sheet feeding or separating mechanisms, without severance of any control or timing connections between the sheet separator and the printing machine 10, and without disturbing any relation or association of the sheet advancing means relative to the printing machine 10.

After the sheet separating means 12 has been swung to an idle position, out of association with the printing machine 10, the sheet advancing means 14 may be moved away from the printing machine, leaving the table top 18 of the machine free for manual operations.

Furthermore, if desired, the sheet separating means 12 and the sheet advancing means 14 may be moved away from the printing machine 10 as a single unit without disturbing any major adjustment of the feeding mechanism.

To this end the automatic sheet advancing mechanism 14 embodies a framework upon which substantially all of the operative mechanisms of the sheet advancing and locating means are mounted. This framework is adapted to be moved as a unit into and out of operative relationship with respect to the printing machine. In the form herein shown, this framework comprises a pair of spaced leg structures 57 and 58 between which a bridging structure 59 is supported. The bridging structure 59 and the leg structures 57 and 58 are so constructed and related that the bridging structure 59 may extend across the table top 18, from end to end thereof, with the leg structures 57 and 58 extending downwardly toward the floor beyond the opposite sides of the table top 18. Thus when the bridging structure 59 is in position across the table top 18 of the printing machine 10, as shown in Figs. 1 and 2 of the drawings, the various operative mechanisms mounted on the frame structure of the sheet advancer 14 are in a predetermined operative relationship to the printing machine 10 as well as to each other. When, however, the sheet advancer 14 is removed from this operative relationship with respect to the printing machine 10, the elements of the sheet advancer remain undisturbed in the desired operative relationship to each other, and the sheet advancer is supported by the leg structures 57 and 58 at substantially the height which these elements occupy when the sheet advancer 14 is associated with the printing machine. Thus the removal of the sheet advancer 14 from or its replacement in an operative relationship to the printing machine is facilitated, and in accomplishment of this purpose the leg structures are preferably provided with casters 60 whereby the sheet advancer may be rolled along the floor in the requisite shifting movement thereof.

Generally the automatic sheet advancer 14 includes means to receive separated sheets and progress and guide them from the left hand side of the machine, along the bridging structure 59, across the table top 18 to printing position, at which point the advancing movement of the sheet is interrupted momentarily for the performance of the printing operation thereon. The advancing means then advances the sheet along the guideway toward the right hand end of the sheet advancer where the sheet is deposited in a suitable collecting means.

The sheet advancing means 14 includes a sheet stop means for interrupting the movement of the sheet at printing position. This interrupting means is operated in timed relation to the operation of the printing machine, and is suitably connected to an operative portion or mechanism of the machine to attain this desired timing. The means which have herein been described generally as forming elements of the present sheet advancer may, in accordance with the broader aspects of the invention, take many different forms and may be interrelated in many different ways. However, the form herein illustrated is similar to that described in Morse Patent No. 2,359,852 issued October 10, 1944. It should be understood that those skilled in the art may make many changes and variations in such means and in their relationship without departing from the scope of the claims appended hereto.

The automatic sheet separator 12, as disclosed herein, includes means to remove sheets one at a time from the top of a stack of sheet 61 and feed them to the sheet advancing means 14 which progresses the sheets across the table top 18 or the printing machine as heretofore mentioned.

Generally the sheet separating means is mounted on a frame 62 supported by suitable legs 63, which are provided with casters 64 to facilitate movement of the sheet separator 12 across the floor. The sheet separator frame 62 is pivotally connected to the printing machine 10 by a suitable hinge or pivotal connection generally indicated in Figs. 1 to 4 inclusive at 65.

The pivotal connection 65 is arranged and constructed to permit the sheet separator 12 to be swung from an operative position relative to the printing mechanism 10 and sheet advancing means 14 (Figs. 1, 2 and 3) to a separated or inactive position out of cooperative association with the sheet advancing means (Fig. 4). The construction of the separating mechanism 12 is such that, when it is swung out of association with the sheet advancing mechanism 14, the various components of the separating mechanism 12, together with the sheet receiving means of the sheet advancing mechanism 14 are readily accessible. This accessibility facilitates the removal of sheets which might become jammed or clogged in the mechanisms as a result of, for instance, feeding of superimposed sheets or the like, heretofore mentioned.

The sheet separating mechanism 12 is also so arranged that it may be detached from its pivotal connection 65 with the printing machine and moved together as a unit with the sheet advancer 14, away from the printing machine 10.

Sheet separator

The sheet separator may take various forms; however in the present embodiment the separator 12 is similar in many respects to that illustrated and claimed in Curtis Patent No. 2,293,046 issued August 8, 1942. In the present embodiment, the separator is best shown in Figs. 1 to 16 inclusive. The separator frame 62, heretofore mentioned, is preferably enclosed in a cabinet 66 provided with suitable doors 67 to permit access to the interior of the cabinet. Mounted on top of the cabinet, at the left hand end as viewed in Figs. 1 to 5 inclusive, is a stack or pile support 68, which supports a stack of work sheets 61 to enable them to be fed one at a time to the printing machine.

The stack support or table 69, which supports a pile or stack of sheets 61 to be fed, is best illustrated in Figs. 3 and 7. As there shown, the stack of sheets 61 is placed on a table 69 with its forward corners seated in vertically extending guides 70 which are adjustable transversely of members 71 of the separator frame 62. The paper table 69 is slidably mounted for vertical movement in the frame 62, the arrangement being such that the table may be raised at periodic intervals to maintain the uppermost sheet in the stack substantially in a predetermined plane where it may be conveniently engaged by the suction foot 72 of the separating mechanism, as will be hereinafter more fully described.

As indicated in Fig. 7, the paper table 69 is provided with a pair of side flanges 73, each of which carries a pair of rollers 74. These rollers project outwardly from the sides of the table 69 and engage the flanges of vertically extending channels 75 carried by the frame 62, thus guiding the table for vertical movement.

The table 69 is supported by a pair of chains, one of which is shown at 76 in Fig. 7. These chains are attached to respective side flanges 73 of the table 69 as at 77 from which they extend upward around respective sprocket wheels 78 and thence downward. Suitable counterweights are secured to the depending free ends of the chains. The sprocket wheels 78 are secured to a cross shaft 79 which is journaled in side plates 80 supported by the frame 62. This shaft extends through the near side plate 80 (Fig. 6) and carries a gear 81 which meshes with a worm 82, supported in bearings carried by the frame plate 80. Thus, the worm and worm gear serve as a brake to restrain the movement of the table and retain it in an adjusted position.

Positioning of the table 69 to receive a stack of sheets or to bring the top of the stack to the desired initial elevation, is accomplished by the operation of a manually operable handle or crank 83. This handle is rotatably mounted on the outer end of the shaft 79, which as indicated in Fig. 3, extends outward to the exterior of the cabinet. The handle 83 is axially slidable on the shaft 79 to permit it to be brought into clutching engagement with a gear 84 which is rotatable on the shaft 79 and which meshes with a gear 85 mounted on a stub shaft carried by the frame plate 80. Drivingly secured to the gear 85 is a bevel pinion 86 which meshes with a similar bevel pinion 87 secured to the worm 82 in any well-known manner, thus completing a manual drive to the worm gear, to raise or lower the table 69.

The paper table 69 is periodically raised by a power operated mechanism, the effective operation of which is controlled by the height of the stack. This mechanism forms the subject matter of Curtis Patent 2,358,560 issued September 19, 1944, and reference to that patent may be had for a more complete description of this mechanism. As herein shown, particularly in Figs. 6 and 7, a bail 88 is pivotally mounted on the side plates 80 and extends therebetween in position to engage the uppermost sheet of the stack. To permit withdrawal of the top sheet from the stack, the bail 88 is periodically moved out of contact with the sheets by a system of links actuated by the printing machine 10, as will be hereinafter more fully described. Suffice it here to say that a lever 89 is pivoted as at 90 to a side plate 80. A bar 91 is connected to the lever 89 by a pin and slot connection 92 and is provided with a spring 93 which normally maintains the left hand end of the slot (Fig. 6) in engagement with the coacting pin. At its right hand end the bar 91 carries a pin 94 which projects through an opening 95 in the side plate 80 and is connected with an arm 96 journaled on the bail pivot 97.

A resilient connection 98 (Fig. 7) is provided between the arm 96 and the bail 88. The bail 88 comprises a bar which extends transversely across the stack and which is provided with slotted arms 99 which are adjustably secured to respective bell cranks 100, the latter being pivoted to respective side plates 80, as at 97.

Whenever the height of the stack falls below a predetermined level, the bail moves downward until a pin 101, carried by the arm 91, engages the upper end of a latch 102 which is pivoted at 103 to a side plate 80. A deficiency in the height of the stack causes the pin 101 to engage and swing the latch in a clockwise direction (Fig. 6), against the action of a spring 104, drawing the lower end of the latch out of engagement with an abutment 105 of a pawl carrier 106. The carrier is pivoted on a ratchet wheel shaft 107 upon which a ratchet wheel 108 is rotatably mounted. The withdrawal of the latch 102 permits a spring to rock the pawl carrier about the shaft 107 in a clockwise direction and into contact with a stop 109, whereupon the parts assume a position wherein a pawl 110, pivotally connected to the carrier, as at 111, is in engagement with the ratchet wheel 108 and is in position to impart an advancing movement to such wheel consequent upon a counterclockwise movement of the pawl carrier.

The ratchet wheel is advanced by movement of the lever 89. As shown in Figs. 6 and 16, a bar 112 is pivotally secured between the lower end of the lever 89 and a pivoted supporting arm 113. The pivotal connection between the arm 113 and the bar 112 comprises a pin 114, which, as the bar moves to the right, engages an abutment 115 on the pawl carrier 106, swinging it in a direction to advance the ratchet wheel a distance of one tooth. The movement of the ratchet wheel is imparted to the worm 81 by a gear 116 which is drivingly secured to the ratchet wheel 108 and which is in constant engagement with the gear 84 heretofore described, thus actuating the table raising mechanism.

As long as the top of the stack of sheets 61 remains below the desired elevation, the latch 102 will be retained in its unlatched position and the ratchet wheel operating mechanism will continue to function in repeating cycles of operation. When the stack reaches the desired elevation the spring 104 will draw the latch into a latching position whereupon it will reengage the the abutment 105, and stop the pawl carrier 106 in the position indicated by dotted lines in Fig. 16. When the height of the pile drops a predetermined amount, the latch 102 will again be moved by the operation of the bail 88, and the pile again raised. Thus, the top sheet of the stack for all practical purposes is maintained at a constant elevation.

To free the ratchet wheel 108 from the power operated mechanism, when the crank 83 is actuated to manually position the paper table 69, a pawl release lever 117, pivotally mounted on the near frame plate 80 (Fig. 6), is manually turned clockwise to cause the end 118 thereof to engage a pin 119 on the pawl 110 and move it out of engagement with the ratchet wheel 108. A spring, not shown, normally maintains the lever 117 in an idle position.

The sheet feeding mechanism is constructed to feed work pieces of various sizes. The arrangement is such that sheets narrower than the maximum capacity of the feeding mechanism may be positioned on the stack supporting table and adjusted transversely of the table to enable the desired area of the sheet to be aligned with the printing device in printing position. Thus the position of the impression transversely of the work may be adjustably predetermined. To this end, the adjustable guides 70 are supplemented by side guides 120 to retain the stack in proper transverse position. The guides 120 are best shown in Figs. 2 and 3, and comprise plate-like formations which project downward from a transverse supporting bar 121 on which they are adjustable transversely of the stack supporting table. The bar 121 is adjustably mounted for movement longitudinally of the feeder, on a pair of bars 122 which are secured to respective frame plates 80, of the separator frame 62.

The mechanism which separates and removes the top sheet from the stack of sheets 61 may take various forms, but is herein illustrated as being of the form disclosed in Curtis Patent No. 2,293,046 of August 18, 1942. Such mechanism utilizes a suction foot which is lowered into contact with the top sheet, suction applied drawing the sheet into contact with the lower end of the foot, whereupon the foot is raised, moving a short distance rearwardly while raising, and then moved in a substantially forward direction to insert the separated sheet between a pair of coacting rolls. As the sheet is inserted into the bite of these rolls, the suction is released and the rolls complete the withdrawal of the sheet from the stack. After the rolls have completed the withdrawal of the sheet, the suction foot is lowered into contact with the next sheet on the stack and the cycle of operation is repeated.

The suction foot in the present embodiment is shown at 72 in Figs. 3 to 8 inclusive, and is connected by a flexible conduit 123 with a control valve 124, which in turn is connected by a conduit 125 with a vacuum pump 126. The pump 126 is mounted in the frame 62 and is driven, through the medium of suitable pulleys and a driving belt 127, by a motor 128 also mounted in the frame 62.

The suction foot 72 is adjustable transversely of the separator 12 so as to permit accurate feeding of the sheets from various transverse positions without altering the position of the separator relative to the printing mechanism. In the present embodiment, one suction foot 72 has been illustrated; however it is contemplated that two or more suction feet may be used, dependent upon the type of work for which the machine is to be used. As shown herein, the foot 72, Figs. 3 to 8 inclusive, is slidably mounted on a shaft 129 and a set screw 130 is provided to facilitate the securing of the foot in the desired transverse position relative to the feeding and printing mechanisms.

The suction foot 72 is operated by the lever 89, which is operated in timed relationship with the printing mechanism, as will be hereinafter more fully described. As illustrated in Figs. 2, 3, 7 and 8, the shaft 129 carrying the suction foot 72 is journaled at its ends in a pair of arms 131 which are secured to a cross shaft 132 rotatably mounted in the side plates 80. The shaft 132 has secured to its outer end, a lever 133 carrying a roller 135 which coacts with a cam 134 pivoted as at 136 to the frame plate 80 and connected by a link or bar 137 to the upper end of the lever 89.

The rocking of the lever 89, heretofore mentioned, thus results in the rocking of the shaft 132 and imparts a rocking movement to the foot carrying shaft 129. The suction foot first raises, moving slightly rearwardly as it does, and then swings forward to move the sheet to the bite of the feed rolls 138 and 139. This operation and movement is best illustrated in Fig. 8. As there shown, an arm 140 is secured to the foot carrying shaft 129 and is provided at its lower end with a roller 141 which is drawn by a spring 142 into engagement with a guide plate 143 secured to a side plate 80. This guide plate (Fig. 8) inclines upwardly and rearwardly so that as the shaft 132 and arms 131 rock in a clockwise direction, the lower end of the suction foot moves upward and rearward, as indicated by the progressive series of dotted lines 144. When the foot 72 reaches the position indicated by the uppermost of these lines, a second roller 145, carried by the arm 140 is engaged by a stationary abutment 146. Continued rocking of the parts about the shaft 132 then causes the suction foot to swing in a clockwise direction about the moving axis of the shaft 129, moving the foot toward the bite of the feeding rolls as indicated by the series of dotted lines 147. This movement of the suction foot has been found to be highly efficient in separating the top sheet from the stack and enables the feeding of sheets of various thicknesses at relatively high speeds.

At the front of the stack of sheets 61, there is a transversely extending frame bar 148. Mounted on this bar and extending over the front edge of the stack are one or more flat spring fingers 149. The fingers are adjustably positioned on the bar 148 by adjusting screw 150 (Fig. 7), which enables the fingers to be adjusted for various types of workpieces. Each finger 149 is normally spaced a predetermined distance above the uppermost sheet 61 of the stack and above the lowermost position of the sheet engaging surface of the suction foot 72. It will be noted from Fig. 7, that these spring fingers project inwardly above the stack, but a comparatively short distance, hence, as the suction foot raises a sheet 61 from the stack, the innermost end of the sheet is drawn with a wiping motion past the end of the finger. Should two or more sheets tend to rise with the suction foot, this wiping movement generally causes all but the top sheet to return to the stack.

The suction to the foot 72 is controlled by opening the valve 124 to atmospheric pressure. The valve is best shown in Figs. 9 and 10, and comprises a valve body having a through passageway 151, the opposite ends of which are in communication with the conduits 123 and 125 respectively. Intermediate its ends the valve body is provided with a port 152, which when closed, brings the suction side of the pump into direct communication with the suction foot 72. However, when this port is opened, the suction to the foot is broken by atmospheric pressure entering the port.

The valve port 152 is opened and closed in timed relationship with the operation of the suction foot 72. Pivoted to the body of the valve 124 is a lever 153 which carries a closure 154 for the port 152. A spring 155 normally retains the closure seated against the valve port. In Fig. 9, the parts are shown in the positions they assume immediately after the closing of the valve port to apply suction to the foot 72. It will be remembered that the foot is raised and swung forward by the clockwise rotation of the shaft 132. Secured to this shaft is a lever 156 having an inwardly extending portion 157 which carries an adjustable screw 158 and a contactor 159. As the shaft 132 swings to cause a sheet to be fed, the lever 156 swings toward the upper end of the valve lever 153, and as the feed rolls 138 and 139 grip the sheet, the screw 158 contacts the lever 153, opening the port 152 and causes the sheet to be released from the suction foot.

When the valve closure lever 153 moves to open the valve port, a pin 160 carried thereby engages and cams upward one arm of a bell crank 161. A spring 162, interposed between the bell crank and a frame plate 80 then causes a latch portion 163 of the bell crank to engage the pin 160 and retain the valve closure 154 in an open position. On the return stroke of the foot 72, the swinging of the shaft 132 in a counterclockwise direction, then causes the contactor 159 of the lever 156 to engage an adjustable screw 164 on the upper arm of the bell crank 161, and move the latch portion thereof out of engagement with the port closure lever 153, closing the port and returning the parts to the position illustrated in Fig. 9.

The pressure side of the pump 126 is connected by a pair of conduits to respective jets 151 disposed at opposite sides of the stack of sheets. As shown in Fig. 7 these jets direct air under pressure toward the sides of the uppermost sheets in the stack. The jets are adjustably mounted so that they may be positioned adjacent the forward edges of the stack, regardless of the size of the sheet, and direct blasts of air beneath the forward portion of each sheet while it is being lifted by the suction foot.

The rolls 138 and 139 complete the withdrawal of a sheet 61 from the stack and advance such sheet across a plate 162 to coacting rolls 163 and 164 which in turn advance the sheet across a plate 165 to a third set of coacting rolls 166 and 167 which advance the sheet across a plate 168 to the sheet advancing mechanism 14. The rolls 138, 163 and 166 are all journaled in the frame plates 80 and each is provided with a shaft portion 169 which extends outward beyond the near frame plate 80. As illustrated in Fig. 5, each shaft portion 169 is provided with a pulley 170 and these pulleys 170 are interconnected by a driving belt 171 so that the application of power to the roll 166, as hereinafter more fully explained, will drive all three rolls.

As illustrated in Figs. 3 and 7, the lower withdrawing roll 138 extends substantially the entire width of the sheet separator 12, whereas the upper roll comprises a plurality of rolls 139 which are adjustable for sheets of different thickness. The rolls 139 are rotatably mounted on a shaft 172. This shaft (Fig. 8) is mounted between a pair of arms 173 which are pivotally mounted on a cross frame shaft 174. Secured to each arm 173, as at 175, is an upwardly extending threaded stud 176, which passes freely through a block 177, carried by the adjacent side plate 80, and which is engaged at its upper end by a knurled nut 178.

A compression spring 179, interposed between an abutment 180 on the stud and the lower face of the block 177, resiliently maintains the arm in its lowermost position and prevents damage to the parts.

The rolls 139 are adjustable transversely of the sheet separator to enable them to be positioned to the best advantage for the type and size of sheet with which the feeder is used. As shown in Figs. 3 and 7, the rolls 139 are slidable axially of the supporting shaft 172 and are adjustably positioned thereon by forks 181 which are mounted on the shaft 174 and embrace their respective rolls 139.

The upper rolls 167 likewise comprise a series of individual rollers which are adjustable transversely of the separator. Each roll 167 is journaled in one end of a fork 182. The forks 182 are pivotally mounted for axial adjustment on a rod 183 which is mounted in the frame plates 80 and which extends transversely of the sheet separator. The rollers 164 also comprise individual rolls which are mounted on pins 184 (Figs. 7 and 11) carried by arms 185 which are also pivoted on the rod 183 for axial adjustment. Springs 186 interposed between the forks 167 and the arms 185 act to retain the rolls 167 and 164 in coacting relationship to respective rolls 166 and 163. The forks 181 and 182 are each constructed to overlap the arms 185 and limit upward movement of the sheet as it passes through the separator.

The suction foot 72 and its valve are actuated from the main drive shaft 37 of the printing mechanism. The shaft 37 (Figs. 20 and 21) is provided with a one revolution clutch which has its driven member fixed to a gear 188 rotatably mounted on the shaft 37. The driven member of this clutch 187 includes pawl 189 which is spring biased so that when released it engages the hub of the pulley 33 so as to be rotated with the pulley. A stop lever 190 pivoted as at 191 is biased into engagement with the flange of the driven member of the clutch and with the pawl 191 by a spring 192. When so positioned the lever locks the driven member against rotation in either direction.

The stop lever 190 is withdrawn from the driven member and pawl 189 of the clutch early in each operating cycle of the printing mechanism 10. To this end a link 193, connected with an arm 194 carried by a rock shaft 195, which forms part of the driving mechanism of the platen 16, and which is rocked in a counterclockwise position (Fig. 20) during the first half of the cycle of operation of such mechanism. The other end of the link 193 is guided by an elongated slot 196 formed therein and engaging the pivot pin 191. When the arm 194 is moved in a counterclockwise direction, a cam surface 197 of link 193 engages a roller 198 on the stop lever 190 and moves it to release the pawl 189. The timing is such that the link 193 is returned to the position shown in Fig. 20 before the clutch 187 completes a cycle of operation and accordingly the stop lever 190 disengages the clutch following the completion of one cycle of operation.

The pinion 188 drives a shaft 199 mounted on the exterior of the printing machine. This pinion meshes with a pinion 200 secured to a shaft 201 journaled in bearings 202 carried by the frame member 39 heretofore described. The shaft 201 projects through an opening in the printing machine housing and is drivingly coupled by a coupling member 203 with the shaft 199. The shaft 199 is journaled in a bearing bracket 204 which is secured to the printing machine as by suitable bolts 205 which extend through reenforcing and frame members 206 of the printing machine 10.

As previously mentioned, one of the features of the present invention is the manner of attaching the sheet separator 12 to the printing mechanism 10 whereby the separator may be swung into and out of active association with the printing mechanism and then swung back to its operating position without change of the various adjustments of the separator, and in such manner that the timing relationship between the separator and the printing mechanism will be the same, after the separator has been returned to its active position as though the separator never had been moved. This is particularly advantageous as it facilitates rapid removal of misfed sheets from the separator mechanism.

The swinging of the separator mechanism is accomplished by providing a pivotal connection between the printing mechanism 10 and the sheet separator mechanism 12. This connection is generally indicated at 65 in Figs. 2, 3, 4, 17, 18, 21 and 22, and is so constructed as to permit the separator mechanism to be rolled along the machine supporting surface to swing about a vertical axis adjacent the rear of the printing mechanism, and from the full line position 12 shown in Fig. 2 to the dotted line position 12 therein shown, or as more clearly illustrated from the position shown in Fig. 3 to the position illustrated in Fig. 4.

The pivotal connection 65 includes the bracket member 204 heretofore described as being secured to the printing machine by bolts 205. This bracket, as shown in Figs. 17, 18, 21 and 22, extends outward from the left hand end plate 207 of the frame 17 of the printing machine adjacent the rear edge thereof, and is provided with a pair of outwardly extending vertically spaced ears 208 in which a post of shaft 209 is journaled and about the axis of which the sheet separator swings. Secured to the shaft 209 intermediate the ears 208 are a pair of spaced ears 210 of a second bracket formation 211 to which the sheet separator is secured. The brackets 204 and 211 thus form a hinge to permit swinging of the sheet separator about a vertical axis.

The connection between the pivot bracket 211 and the separator 12 is best shown in Figs. 18 and 22. As there illustrated a rod 212 is secured in a socket formed in the bracket 211 by a set screw 213. When the separator 12 is in its normal or operative position relative to the printing mechanism 10 and the sheet advancing mechanism 14, the rod 212 extends forward from the bracket 211 of the pivotal connection 65 with its axis extending in a direction substantially at right angles to the path of progress of sheets through the mechanisms.

The shaft or rod 212 extends forwardly and passes through an elongated bushing 214 which is fixed to the frame 62 of the separator some distance below the horizontal plane of the separator rolls 138, 163 and 166 heretofore described. Thus the sheet separator 12 is supported for swinging movement about the axis of the shaft 209 of the pivotal connection 65.

The supporting shaft 212 is of such length as to permit adjustment of the separator mechanism 12 from front to rear of the printing mechanism and thus assist in the positioning of the impression on a sheet and enabling maximum use of the full width of the separator mechanism. As shown in Fig. 18, the shaft 212 is provided with an axially extending flattened portion 215 against which a set screw 216, carried by the bushing 214, may seat to fix the separator in an adjusted position axially of the shaft 212. While the set screw 216 is illustrated as being provided with a slotted head to receive a screw driver, it like the other adjusting screws may be provided with a more convenient knurled head or similar means to facilitate adjustments.

The timing and driving connection between the printing mechanism and the sheet separator includes the shaft 199 which, as heretofore mentioned, is journaled in the bracket 204. Secured to the shaft 199 within the pivotal connection 65 is a beveled pinion 217 which engages a beveled gear 218 rotatably mounted on the pivot shaft 209 of the connection 65. The gear 218 also coacts with a second beveled gear 219 positioned within the pivotal connection and secured to one end of a shaft 220 which is journaled in the bracket member 211 of the connection 65. The shaft 220 is positioned above and parallel with the rod 212 which as heretofore described connects the pivotal connection 65 with the separator mechanism 12.

The gears 217, 218 and 219 are protected by a coverplate 221 secured to the bracket 211, and by a pivoted coverplate 222 which is pivotally mounted on a rod 223 carried by the bracket 204 and biased in a closed position by a suitable spring, such as that shown at 224 in Figs. 3 and 4.

The shaft 220 drives the timing mechanism of the sheet separator and is connected to actuate the suction foot 72 in timed relation with actuation of the printing mechanism 10. The shaft 220 (Fig. 17) extends through and is splined to the hub 225 of a pinion 226 by a key and keyway connection 227. The hub of this gear is journaled in a bushing or bearing 228 carried by a frame plate 80 of the separator mechanism 12. Thus the separator mechanism may be adjusted axially of the shafts 212 and 220 without disturbing the relation of the pinion 226 to the other gearing in the separator mechanism.

The pinion 226 meshes with a pinion 229 (Figs. 7 and 14) which is adjustably secured in position on a shaft 230 journaled in bearings 231 carried by the frame plates 80 of the separator frame 62 by a set screw 232. The shaft 230 is drivingly connected with a shaft 233 by a change speed gearing 234 hereinafter to be more fully described. Secured to one end of the shaft 233, externally of the far frame plate 80, by a set screw 235 is a pinion 236. This pinion engages a gear 237 (Figs. 6 and 14) which is mounted on a bushing 238 journaled on an end of the shaft 230 which projects outward beyond the far frame plate 80. A disc 239 is secured to the outer face of the gear 237 by bolts 240 and carries a pin 241 which is positioned eccentrically of the axis of rotation of the disc 239. The arrangement is such that when the change speed gearing 234 is in the position shown in Fig. 14, the disc 239 makes one complete revolution for each revolution of the shaft 230 and the latter makes one complete revolution for each complete revolution of the one revolution clutch 187 of the printing mechanism. Accordingly the disc 239 makes one revolution for each cycle of operation of the printing mechanism 16.

The suction foot 72 moves through a complete cycle of operation for every complete rotation of the disc 239 and hence, when the change speed gearing is in the position shown in Fig. 14, the suction foot 72 completes a cycle of operation for each cycle of operation of the platen 16 of the printing mechanism. To accomplish this, a bar 242 (Fig. 6) is connected between the pin 241 of the disc 239 and the upper end of the operating lever 89, which as heretofore stated actuates and controls the operation of the suction foot 72 and the stack raising mechanism.

Despite the precautions taken and the high efficiency of the sheet separating mechanism, it has been found that climatic conditions and other factors, particularly irregularities, blemishes or semi-porous condition of the paper sheets themselves, sometimes causes more than one sheet to be fed at a time. This has numerous disadvantages too well known in the printing art to require enumeration here. To prevent the delivery of superimposed sheets to the printing machine, a gauge or detector 243 is provided. When superimposed sheets pass between the rolls 138 and 139 this detector acts to actuate means which causes the printing machine to be stopped at the end of the cycle of operation then in progress.

The detector 243 is of such construction that when superimposed sheets are fed by the suction foot 72 into the bite of the rolls 138 and 139, the operation of the printing mechanism and that of the suction foot 72 is stopped.

The detector 243 is best illustrated in Figs. 3, 7, 11 and 12 and as there shown comprises a hooked plate depending between a pair of the upper feed rolls 139. The detector 243 is arranged to be adjusted so that its lower edge is spaced above the roll 138 a distance sufficient to clear a single sheet as such sheet passes between the rolls 138 and 139, but so as to be engaged by the uppermost sheet when superimposed sheets are fed between such rolls.

The detector plate 243 is pivoted as at 244 to one arm of a bell crank 245 which is pivotally secured as at 246 to a bracket or carrier 247 for supporting the detector and its associated mechanism. The bracket 247 is mounted for adjustment transversely of the separator mechanism 12 and may be adjusted relative to the feed rolls 139 to provide for sheets of differing thicknesses. As shown in Figs. 3 and 11, the bracket 247 is slidably mounted on a transversely extending bar or rod 248 which is secured to the frame plates 80 of the separator mechanism. Rotation of the bracket 247 is prevented by a guide rail 249 spaced below the bar 248 and carried by the frame plates 80. An adjusting bolt 250 carried by the bracket 247 engages the bar 248 to secure the bracket and its associated detector mechanism in proper transverse adjustment.

When superimposed sheets are fed between the rolls 138 and 139, the upper sheet engages the lower surface of the detector plate 243 and swings the detector plate slightly counterclockwise about its pivot 244. This motion of the detector member is utilized to actuate an electric switch 251 carried by the bracket 247. As shown in Fig. 11, the detector 243 is pivotally connected by a link 252 with an arm 253 which is pivoted as at 254 to the bracket 247. This arm is provided with a lug 255 in which an adjusting screw 256 is mounted. The arrangement is such that when the detector plate 243 is swung counterclockwise (Fig. 11) it swings the arm 253 to cause the head 257 of the adjusting screw 256 to engage a plunger 258 of the switch 251 and cause an electrical contact to be made.

The switch 251 of the present embodiment is a normally open switch capable of being opened and closed with a very small amount of movement. This switch is arranged to function in the same manner as the switch 52 which it will be recalled is closed when the detecting finger 54 senses the feeding of the last printing device from the magazine 15 of the printing mechanism 10.

A connection is provided between the switch 251 and the auto stop mechanism of the printing machine. This connection comprises a pair of wires 259 and 260 which are connected between respective terminals of the switch 251 and a removal plug 261 which coacts with a socket 262 mounted on the frame plate 207 of the printing mechanism 10. The socket 262 (Fig. 24) is connected by a pair of wires 263 and 264 with the wires 151 and 153 heretofore described. Thus connecting the switch 251 in parallel with the switch 52. Accordingly, whenever superimposed sheets pass between the rolls 138 and 139, the printing mechanism will stop as soon as it completes the cycle of operation in progress at the time of actuation of the switch mechanism. The timing of the various mechanisms is such that the stopping of the printing mechanism by the auto stop mechanism prevents further actuation of the suction foot 72 of the separator mechanism. Before the printing mechanism or separating mechanism may be again placed in operation the operator will have to reset the plunger 46 of the auto stop mechanism as heretofore described.

The sheet detector 243 is arranged to be vertically adjusted to accommodate sheets of various thicknesses. As illustrated, the upper arm 265 of the bell crank 245 is connected by a pin and slot connection 266 with a horizontally extending plunger 267. This plunger is slidably mounted in the bracket 247 and is normally urged in its left hand position by a coil spring 268. An adjusting screw 269 passes through the bracket 247 and threadingly engages the plunger 267 to limit its outward movement. The head of the adjusting screw 269 is fluted to be engaged by a spring 270 which is secured to the bracket and acts to retain the adjusting screw in position. The arrangement of the detector plate 243 is preferably such that it engages the sheet slightly before the sheets pass a plane extending through the axes of the rolls 138 and 139.

A second detector mechanism is provided to stop the printing mechanism 10 and the separating mechanism 12 in case the separating mechanism fails to deliver a sheet to the sheet advancing mechanism 14. This detector mechanism is best illustrated in Figs. 7, 11 and 13. As there shown, the lower feed roll 166 of the sheet separator mechanism is provided with an annular groove 271 which is bridged by the sheets as they pass between the rolls 166 and 167. When a sheet is not present to bridge the groove 271, a roller 272 rotatably mounted on a pivoted lever 273 drops into the groove, thereby swinging the lever about its pivot. This swinging movement is used to actuate the switch 251 which, as heretofore explained, operates the auto stop mechanism and stops the operation of the suction foot and the printing mechanism.

The lever 273 is adjustably clamped on a pin 274 by a clamping bolt 275. The pin 274 is secured to an arm 276 which is pivoted to the bracket 247 heretofore described. The arm 276, the lever 273 and the detector wheel 272 thus rock as a unit clockwise about the pivotal connection between the arm and the bracket 247 whenever the wheel drops into the groove 271 due to the absence of a bridging work sheet. This pivoting movement of the arm 276 causes a projection 277 to engage a pin 278 on the lever 253 and cause the lever to actuate the switch 251 and thereby stop the printing mechanism and sheet separating mechanism as heretofore described.

While the detector 243 may remain in its active position at all times, the detector roller 272 must be normally held out of its active or sensing position and permitted to perform its sensing operation only at a time in the cycle of operation of the separating mechanism when a sheet ordinarily should be in bridging position relative to the groove 271 in the roll 166. To accomplish the timing of the sensing operation of the roller 272, there is provided a cam 279 (Figs. 6, 14 and 15). This cam comprises a disc-like formation and is secured to the gear 237 by the bolts 240 which hold the disc 239 in place thereon. The cam 279 engages a roller 280 carried by a lever 281 which, as shown in Fig. 7, is pivoted intermediate its ends as at 282 to a frame plate 80 of the separator mechanism. A link 283 is interconnected between the arm 281 and an arm 284. This arm is secured to a rock shaft 285 journaled in the frame plates 80.

The movement of the cam roller 280 is transmitted to the detector wheel 272 by an arm 286 adjustably clamped to the rock shaft 285 by a bolt 287. The arm 286 engages the pin 274 carried by the lever 276 heretofore described. The lever 281 may be biased by a suitable spring (not shown) to cause it to retain the roller 280 in engagement with the surface of the cam 279. Accordingly, the detector roller is permitted to perform its sensing operation only when the cam roller 279 drops into a peripherial recess or undercut portion 288 of the cam 279.

As heretofore mentioned, when the change speed gearing 234 is in the position shown in Fig. 14, the gear 237 makes one complete revolution for each cycle of operation of the printing mechanism and the suction foot 72 is controlled by the rotation of the gear 237. Accordingly the sensing operation of the roller 272 will be permitted to take place in timed relation to the operation of the suction foot 72 and only when a work sheet should be gripped between the rolls 166 and 167.

The feed roll 166, as heretofore explained, is drivingly connected by a drive belt 171 to operate the feed rolls 138 and 163. The roll 166 is driven by the motor 128 of the sheet separator mechanism 12. The motor 128 drives the suction pump 126, the shaft 289 of which is provided with a pulley 290 which is drivingly connected by a belt 291, with a drive pulley 292, secured to a shaft 293 suitably journaled in the frame 62 of the separator mechanism. A gear 294 is secured to the shaft 293 and, as shown in Fig. 5, meshes with a gear 295 carried by the shaft 230 which, as heretofore described, is journaled in the frame plates 80 of the separator mechanism.

As shown in Fig. 14, the gear 295 is rotatably mounted on the shaft 230 and hence its rotation is independent from that of the shaft. Similarly mounted on the shaft 233 is a pinion 296 which is in constant driving engagement with the gear 295 as well as with the a gear 297 carried by a stub shaft 298 secured to the frame 80 as by a nut 299. The gear 297 is arranged to constantly mesh with a pinion 300 carried by the shaft of the lower feed roll 166. Accordingly the various feed rolls are constantly driven by the motor 128. The arrangement of this drive is such that once a sheet is passed to the rolls 138 and 139 by the suction foot 72, such sheet is rapidly delivered to the sheet advancing mechanism 14 by the constantly rotating pairs of rolls 138, 139; 163, 164; and 166, 167.

Power is supplied to the motor from the power lines 301 and 302 which connect the switch 32 of the printing mechanism 10 with its motor 31. These power lines are connected by wires 303 and 304 (Fig. 24) with a receptacle 305 carried by the frame member 207 of the printing machine and cooperating with a removable plug 306. The plug 306 is connected by a wire 307 with the motor 128 and, by a wire 308 with one terminal of a switch 309. This switch is mounted on the cabinet of the sheet separator (Fig. 1) and has its other terminal connected by a wire 310 with the motor 128.

Following the stopping of the printing mechanism as a result of the detection of superimposed sheets, the sheet separator mechanism may be swung from its active or operating position shown in Fig. 3 to its idle position shown in Fig. 4, to facilitate access to the mechanism and permit removal of the superimposed sheets. It is obvious that considerable time is saved by the use of the present invention whereby the sheet separator may be restored to its active position and when so restored will function to operate as though it had not been disturbed and wherein the restoration may be made by unskilled operators as easily as by skilled operators.

It is sometimes advantageous to make certain adjustments, such as for instance that of the suction foot 72 while the feeding mechanism is swung out of its active position. Similarly it is sometimes desirable to feed certain sheets through the printing mechanism without making an impression thereon. This may be accomplished by actuation of a switch 311 (Fig. 1) conveniently located on the housing of the separator mechanism 12.

It will be remembered that the operation of the auto stop mechanism does not affect the operation of the printing machine motor 31, and that due to the arrangement of the auto stop mechanism and the one revolution clutches of the printing machine, the printing mechanisms as well as the suction foot 72 of the sheet separator 12 always complete a cycle of operation before coming to a stop. Accordingly if the clutch release lever 190 (Fig. 20) is withdrawn independently of the operation of the platen mechanism 16 then the sheet separator mechanism may be operated. This is accomplished in the present embodiment by the switch 311.

The switch 311 (Figs. 1 and 24) is mounted on the separator cabinet and has one terminal thereof connected by a wire 312 with the wire 308 which, as heretofore described, is connected to the power line 302. The other terminal of the switch 311 is connected by a wire 313 to a removable plug 314 which coacts with a receptacle 315 carried by the frame member 207 of the printing mechanism. The receptacle 315 is connected by a wire 316 with one terminal of a solenoid 317, the other terminal of which is connected by wires 318 and 304 with the other power line 301. Thus the actuation of the switch 311 energizes the solenoid 317.

The energization of the solenoid 317 withdraws the clutch release lever 190 from engagement with the clutch pawl 189 and causes the clutch to become active to drive the suction foot 72 and associated mechanism of the sheet separator 12.

The solenoid 317 is illustrated in Fig. 20 as being secured to the frame member 39 of the printing mechanism. When this solenoid is energized, its core 319, which is connected by a link 320 with a lever 321 pivoted about the pin 191, rocks the lever counterclockwise causing a pin 322 carried by the lever to engage the clutch release lever 190 and move it to a clutch releasing position, thus rendering the sheet separator active.

If the switch 311 is momentarily actuated and then released the separator mechanism will be actuated through one complete cycle of operation only. However, if the switch 311 is held closed, the separator mechanism will operate through continued cycles of operation. Due to the single revolution clutch 187 the separator mechanism will always stop at the end of a complete cycle of operation and thereby maintain its timed relationship with the printing mechanism 10.

The operator may desire to stop the printing mechanism while attending the sheet separator, accordingly the sheet separator is provided with a third switch 323 which is placed in series with the switch 251 of the detector mechanisms by wires 324 and 325. The switch 323 is normally open, hence the closing of this switch will have the same effect as the closing of the detector switch 251 which, as it will be remembered, actuates the auto stop mechanism to stop the printing machine 10 and to cause the separator mechanism 12 to cease to feed sheets to the sheet advancing mechanism 14.

*Sheet advancing mechanism*

The sheet separator mechanism 12 feeds the sheets to the sheet advancing mechanism above the plane of the bridge structure 59 and somewhat to the left of the left-hand leg structure 57. The sheet advancing means may take various forms, as for instance, those shown in Morse Patent 2,359,852 heretofore mentioned. The sheet separating means as illustrated herein feeds the separated sheets in a right-hand direction into an adjustable guideway 326 which extends entirely across the bridging structure from left to right. The guideway 326 has suitable advancing means associated therewith such as one or more endless fabric belts 327 and a hold-down means 328 which maintains each sheet in operative frictional engagement with at least one of the belts 327. Thus when a sheet has been fed into the guideway between the hold-down means and one or more of the belts 327, this sheet is advanced to the right across the table top in accordance with the driven speed of the belts 327.

Means is provided for interrupting such movement of the sheet when it reaches printing position. This means may take various forms, that illustrated herein being more fully shown and described in Morse Patent 2,359,852 heretofore mentioned. As shown herein, this means may comprise a stop mechanism 328 which is lowered into an active position in the path of the advancing sheet at the proper time in the machine cycle. After the performance of the printing operation the stop element 328 is retracted or elevated so that the sheet is again actuated and advanced to the right by the belt or belts 327. When the sheet reaches the end of the upper run of the belts, it is discharged into a collecting or receiving hopper 329 disposed on the framework of the sheet advancer just to the right of the right-hand leg structure 58.

When a sheet is fed from the sheet separator 12 along the guideway 326 to the printing position, this sheet is disposed face down, with the normal top edge of the sheet disposed along the rear edge of the guideway 326 and the edge which is normally the left-hand edge of the sheet disposed as the leading edge of the sheet. Thus the location of the printing impression transversely of the sheet is determined by the location of the stop element 328 along the guideway 326, and this transverse location of the printing impression may be varied by adjustment of the stop element 328 along the guideway 326.

The location of the printing impression vertically of the sheet is determined by the location of the guideway 326 with respect to the forward edge of the printing machine. Thus by positioning the sheet advancer 14 as shown in Fig. 2 of the drawings, and with the guideway adjusted on the sheet advancer frame as there shown, a particular location of printing impression vertically of the sheet will be obtained, and in the event that the operator wishes to change this location of the printing impression, such a result may be obtained by slightly shifting the sheet advancer frame in a forward direction with respect to the printing machine frame. The same result could, of course, be obtained by a different setup of the guideway 326 and the related mechanisms and by similarly changing the location of the sheet separator on its supporting bar 212.

Since the sheets or forms to be fed may vary considerably in shape or dimension, the bridging structure 59 is so constructed that it is open throughout substantially its entire area, thereby to enable substantially any portion of the lower face of such a form to be pressed downwardly into printing cooperation with the printing device located at printing position in the printing machine.

The bridging structure 59 is formed by a front rail 330 and a rear rail 331 which are spaced apart so as to be located along and to form the front and rear edges of the bridging structure. As shown in Figs. 1 to 7 and 24, the front and rear rails 330 and 331 extend over and beyond the left-hand and right-hand leg structures 57 and 58 to facilitate the mounting of other structural elements of the automatic sheet advancer.

The leg structure 57 is formed by a pair of spaced leg members 57 connected near their lower ends by a suitable cross bar. The upper ends of the leg members 57 extend between and are bolted to downwardly extending flanges 332 and 333 of an inverted sheet metal channel 334. The rails 330 and 331 extend across the closed upper end of the channel 334 and are secured thereto as by welding.

The leg structure 58 is similarly formed from a pair of spaced leg members 58 connected near their lower ends by a cross bar (not shown). At their upper ends, the two leg members extend between and are secured to downwardly extending flanges of a sheet metal channel member 335 which is generally similar in form to the channel 334. The rails 330 and 331 extend across and beyond the closed upper end of the channel 335 and are secured thereto as by welding.

The leg structure 58 is braced with relation to the bridge structure 59 by bracing and mounting plates 336. One of the plates 336 abuts the forward edge of the projecting end of the front rail 330 just to the right of the leg structure 58 and is secured thereto by screws 337. The other plate 336 is similarly connected with the rear rail 331. The left-hand edge of each of the plates 336 is secured to the right-hand face of the adjacent leg 58 by any suitable means.

The two plates 336 are connected by a plurality of mounting rods which are used in mounting and supporting certain of the elements or parts of the sheet feeder such as, for instance, a sheet-receiving hopper 329.

The hopper 329 may take any form desired, however the hopper shown in Morse Patent 2,359,852 is preferred and hence reference may be had to such patent for a detailed description of the hopper. Suffice it here to say that the hopper 329 is arranged to receive the work sheets as they are discharged from the printing mechanism by the sheet advancing mechanism 14.

The two plates 336 serve as a mounting means for the right-hand belt tensioning and guiding means, and to this end a tensioning roller 338 and a guide roller 339 are disposed between the two plates 336 with the upper surfaces of the two rollers located a slight distance above the top surface of the inverted channel 335. The arrangement is such that the lower run of each belt 327 extends to the right over the top of the guide roller 339 and is then looped downwardly about the tension roller 338 so that the upper run of the belt extends back to the left over that portion of the lower run of the belt which rides upon the guide roller 339. The guide roller 339 is journaled in the plates 336 so as to rotate about a fixed axis. The tensioning roller 338 is journaled in bearing blocks 340 which are mounted slidably in horizontal slots formed in the respective mounting plates 336. Means, such as adjusting screws 341, are provided for adjusting the blocks 340 to tighten the belts 327.

At their other or left-hand ends the belts 327 are arranged in a similar manner. A pair of rollers 342 and 343 are mounted in a pair of spaced plates 344 which are connected between the rails 330 and 331 respectively and the adjacent legs 57. Thus, as indicated in Fig. 5, each plate 344 engages the outer side surface of the adjacent one of the rails of the bridge structure 59, and extends a suitable distance above and below the rails of the bridge structure 59. The downwardly projecting portion of each of the plates 344 is located to the left of the adjacent leg structure 57 and the right-hand edge of each of the plates has an inturned flange 345 (Fig. 5) which is secured to the face of the adjacent leg 57.

As illustrated in Fig. 4, the right-hand roller 343 constitutes a guide roller over which both the upper and lower runs of each belt extend and the left-hand end of each belt encircles the left-hand roller 343. The two rollers 342 and 343 have their central shafts suitably journaled in stationary bearings 346 carried in the downwardly projecting portions of the plates 344. As shown in Figs. 2, 3, 4 and 7, the right hand end of the shaft 347 of the roller 342 has a drive pinion 348 fixed thereon. Thus the roller 342 constitutes a drive roller for the system of belts 327.

The roller 342 and the associated belts 327 are driven continuously during periods of use of the automatic sheet feeder 11. To this end the pinion 348 is positioned so that when the separator mechanism 12 is in its active position (Fig. 3), the pinion is in engagement with the gear 297 carried by the frame plate 80 of the sheet separating mechanism and heretofore described. The construction is such that the gear 297 will readily move into and out of engagement with the pinion 348 whenever the sheet separating mechanism is swung about its pivotal connection 65 into or out of cooperating relation with the sheet advancing mechanism 14. Thus when the separating mechanism is in its active position and the motor 128 of the sheet advancing mechanism is energized, this motor imparts continuous rotation to the drive roller 342 in such a direction that the upper run of each belt 327 moves continuously from left to right along the bridge structure 59 of the sheet advancing mechanism 14, thereby providing a continuously available driving or advancing means for frictionally engaging the lower face of a sheet 61 or the like to move the same to the right along the guideway 326.

As hereinbefore pointed out, the sheet advancer 14 is adapted to be quickly and easily moved into or out of its operative relationship with respect to the printing machine, and cooperating means is provided on the advancer 14 and the printing machine 10 for maintaining the advancer in any desired relationship with respect to the printing machine. This means is such that the advancer may be quickly and easily released for removal from its operative relationship with respect to the printing machine, and such that the sheet advancer may be quickly and easily returned to a previously established relationship.

As shown in Figs. 1, 18 and 19, the printing machine 10 has a pair of supporting and guiding rails or trackways 349 secured on its opposite end panels. To afford adjustability of the rails 349 relative to the table top 18, each of these rails is supported by a pair of longitudinally spaced eccentrices 350, Fig. 18, which are passed through suitable openings formed in such rail and in the adjacent end panel of the printing machine and are clamped in an adjusted position by nuts (not shown) which are threaded on the inner ends of the eccentrics.

The openings in the rail in which the eccentrics 350 are disposed are in the form of slots 351 to enable independent adjustment of the eccentrics for the purpose of leveling the flange of the rail 349. By proper adjustment of the eccentrics the trackways 349 may be disposed parallel to and at a predetermined distance below the table top 18.

Means are provided on the leg structures of the advancer frame for cooperating with the trackways 349 to thereby enable the feeder to be arranged in operative relation to the printing machine. Thus, on the flange 332 of the leg structure 57, a horizontal mounting bar 352 is secured. Adjacent its opposite ends, the mounting bar 352 is provided with rollers 353. These rollers are spaced apart a considerable distance in a direction from front to rear of the feeder frame. A similar mounting bar and similar rollers 353 are provided on the other leg structure 58 for cooperation with the trackways 349 of the right-hand end of the printing machine.

When the sheet advancer 14 is to be moved into operative association with the printing machine, the sheet feeder is rolled along the floor on its casters 60 to a position just forwardly of the printing machine. The sheet advancer is then rolled rearwardly along a path parallel to the trackways 349 until the rear roller at each end of the advancer frame engages the forward end of the adjacent trackways 349. The aforesaid vertical adjustment of the trackways 349 and the location of the rollers 353 in a vertical direction are such that the advancer frame must then be elevated slightly from its normal height in order to position the rollers 353 on the trackways. This elevation may, of course, be very slight, since it is intended only to remove the weight from the legs 57 and 58 and thereby insure accurate interrelation of the sheet advancer 14 and the printing machine 10 in a vertical sense. Rearward movement of the sheet advancer 14 is continued until the forward rollers 353 are in position on the trackways 349, and the sheet feeder may then be moved along the trackways until the desired relationship of the sheet guideway 326 to the printing position has been established.

The relationship between the guideway 326 and the printing mechanism is maintained by latching means which is adapted to be readily connected between the sheet feeder and the printing machine. This latching means, as shown in Figs. 18 and 19, comprises a pair of blocks, one of which is adjustably secured on each of the trackways 349 by a set screw 355. Each mounting block carries a latching pawl 356 pivoted on the mounting block at 357 and having a notch 358 formed therein which is adapted to be moved downwardly into an embracing relationship with respect to the adjacent roller 353. This embracing or interlocked relationship may be maintained by means of a locking screw 359 which is threaded through the latching pawl 356 so that its reduced end 360 may be projected into a locking opening formed in the mounting block 354.

When the desired relationship of the feeder to the printing machine has been established, the mounting blocks 354 are secured in position on the trackways 349 so as to be engageable in the above described manner with the adjacent rollers 353, and when the sheet advancer is removed from its operative position, the mounting blocks 354 are left in this adjusted position. Hence it is possible for the operator to quickly and easily return the sheet advancer to the operative relationship which has thus been established.

The sheet separating mechanism is secured in its adjusted position transversely of the printing machine by its supporting rod 215 heretofore described and which connects the far side of the sheet separator with the pivotal connection 65 between the separator and the printing machine, and by a latch 361 which latches the near side of the separator mechanism to the sheet advancing mechanism.

The latch 361 may take various forms, one of which is illustrated in Figs. 3 and 5. As there shown, the latch 361 includes a grooved pin 362 which is secured to and extends outwardly from the near frame plate 80 of the separator mechanism 14, and which cooperates with a guide plate 363 and latch 364 carried by the near frame member 344 of the sheet advancer 14. The guide plate 363 is secured to the frame member 344 as by rivets 365 and is provided with a slot 366 which, as the separator mechanism is swung into position, engages the pin 362, thus locating the two mechanisms relative to each other.

A latch member 367 is pivotally secured to the guide member 363 as at 368 and is provided with a hooked end 369 which, as indicated in Fig. 3, engages the groove in the pin 362 thereby securing the parts together. Thus latching mechanism is accessible to the operator following the opening of one of the doors 67 of the separator cabinet 66.

The multiple impressions

The mechanisms of the present invention are constructed to be used for multiple impression types of work. Thus the invention may be used to form a plurality of printing impressions from each printing device upon a sheet or form. Where this class of work is being done it is customary to use a sheet or form which is relatively long. It will be recognized, of course, that during the printing of the several impressions upon each sheet, the printing device pertaining to such sheet or form is maintained stationary at the printing position. This action may be attained in the printing machine 10 herein shown through appropriate adjustment and setting of the multiprint mechanism which is controlled by the control plunger 46 and which is described in detail in the aforesaid Hueber Patent No. 2,359,850 of October 10, 1944.

In adjusting the sheet separating mechanism for multiple impression work as hereinabove described, the primary elements remain unchanged. Other than the usual adjustments to compensate for size and thickness of the sheet, and those to adjust the position of the mechanisms to locate the position of the impressions on the work sheet, the only alteration required is that of adjusting the change speed gearing 234.

To effect the adjustment of the change speed gear mechanism 234, the operator, after releasing the latch 361 between the sheet separator 12 and the sheet advancer 14, swings the sheet separator 12 about its pivotal connection 65 with the printing mechanism 10 thus exposing the change speed gearing 234 as shown in Fig. 4. The gearing 234 as shown in Figs. 4 and 14, comprises four gears 371, 372, 373 and 374 which are secured in pairs to the shaft 233 of the separator mechanism as by pins 375. These gears selectively cooperate with respective gears 376, 377, 378 and 379 splined as a unit to the shaft 230 which it will be remembered is driven through one complete revolution for each printing cycle of the printing machine and in definite timed relation therewith.

The normal position of the gearing is illustrated in Fig. 14, where the gear 371 is in engagement with its respective gear 376. Under this condition the disc 239 (Figs. 3, 6 and 14), which as heretofore explained controls the operation of the suction foot 72, makes one revolution for each revolution of the one revolution clutch 187 of the printing machine 10. Thus a sheet is separated from the stack 61 and advanced to the printing position for each operation of the platen mechanism.

When it is desired to make two impressions on each sheet the compound gear member 380 which carries the gears 376, 377, 378 and 379 is moved axially of the shaft 230 until the gear 377 meshes with the gear 372. The relation of these gears is such that they cause the disc 239 to move through one half a revolution for each complete revolution of the shaft 230 and clutch 187. Thus the sheet separator is rendered active once for every two impressions made by the platen. Similarly when the gears 373 and 378 are moved into coacting relation the disc 239 makes one revolution for each three revolutions of the shaft 230 and accordingly separates one sheet from the stack for every three cycles of operation of the printing mechanism. When the gears 374 and 379 are in engagement with each other, one sheet is separated from the stack 61 and fed to printing position for each four cycles of operation of the printing mechanism. Thus with the gearing illustrated the mechanism may be used to make one, two, three or four impressions on each sheet as desired.

Following the shifting of the compound gear member to the desired position, it may be locked in such position by the adjusting bolt 381, and the sheet separator then swung about its pivotal connection 65 into its feeding or active position (Fig. 3), whereupon the latch 361 may be repositioned to secure the separator 12 in such operating position.

The cam 279 which controls the actuation of the detector mechanism rotates as a unit with the disc 239. When quadruple impressions are being made, this cam 279 rotates one fourth as fast as when single impressions are being made. Accordingly, it will be seen that the suction foot 72 moves slower when multiple impressions are made than when single impressions are made. This causes a sheet to be fed to the bite of the rolls 138 and 139 somewhat later in the cycle of operation when multiple impressions are to be made than when single impressions are to be made. The various feed rolls of the separator mechanism and the feeding tapes 327 of the sheet advancer, all operate at the same speed regardless of the number of impressions to be made as they are driven by the independent motor 128 as heretofore explained. This motor operates these feed rolls and the feeding tapes at a rate of speed to insure the arrival of the sheet at printing position before the platen starts to make its first impression thereon, and regardless of whether or not there is slight delay caused by the slowing down of the suction foot 72 as heretofore explained.

An adjustment is provided so that the detector roll 272, which detects the presence or absence of a sheet, may be lowered at the proper time to compensate for variations in the rate of movement of the suction foot 72. To this end the cam roller 280 is carried by an arm 382. This arm has a slot 383 through which a pair of screws 284 pass. These screws pass freely through the arm 382 and engage suitable threaded openings in the lever 281. Thus the effective length of the lever may be adjusted. As the lever is shortened it causes the recess 288 in the cam 278 to coact with the roller 280 later in the cycle of operation of the mechanism and thus shortens the effective length of the lever and compensates for the slowing up of the suction foot when multiple impressions are to be made. For convenience the arm 382 is provided with an index mark 385 which coacts with any one of a plurality of similar index marks on the lever 281, the latter index marks being provided with appropriate designations to indicate the setting for the number of impressions desired.

When multiple impressions are made the endwise position of the sheet is controlled by a control means which may take a form similar to that of Morse Patent No. 2,359,852 heretofore mentioned, hence reference may be had to such patent for a more complete description of such means. In the present embodiment this control means comprises a multiple stop mechanism which is controlled from the sheet separating mechanism 12.

The multiple stop mechanism as herein shown comprises a plurality of stop fingers 328 projecting in rearward direction so as to overlie the guideway 326. The stop fingers are best shown in Figs. 1, 2 and 23, and are mounted on a supporting shaft 386 extending parallel to and above the front rail 330 of the sheet advancer 12. This shaft is journaled in spaced upstanding bearing brackets 387. Each stop finger 328 comprises a rod 388 having one end extending into a supporting casting 389. The rod 388 may be removed from the supporting casting 389 by loosening of a set screw 390. At its other or forward end each supporting casting 239 is bifurcated to provide two spaced arms 391 and 392 which have aligned bores providing bearings through which the mounting shaft 386 extends. Between the two arms 391 and 392 a collar 393 encircles the mounting shaft 395 and is secured in any desired adjusted position axially of the shaft by a set screw 394, thereby facilitating the adjustment of the stop finger lengthwise of the separator as desired.

At their outer or rear ends the rods 388 have depending stop plates 395 secured thereto. When the rear end of the rod 388 is allowed to move downwardly, the stop plate 395 thereof is projected into the path of the leading edge of a sheet being advanced along the guideway 326. After a sheet has been stopped by a stop plate 395, and the desired printing impression has been made upon the sheet, the stop finger is rocked about the shaft 386 so as to raise the stop plate and permit further advancing movement of the sheet.

Where the sheets being fed through the machine are relatively thin so as to tend to adhere to the stop plate 395 when the stop plate is elevated, a stripper plate 396 may be disposed just to the left of such stop fingers 328. As shown in Fig. 25, each stripper plate 396 is curved upwardly at its left-hand edge as indicated at 397. Each stripper plate is supported by a mounting block 398 adapted to be secured by a set screw 399 on the upstanding flange portion of the angle guideway 326. In the present instance the first or left-hand one of the stop fingers 328 is not provided with a stripper plate 396 since the portion of the sheet immediately adjacent to the left of such stop finger is held against appreciable upward movement by the platen roller.

The several stop fingers 328 are actuated in timed relation by a cam mechanism which is driven by the sheet separator mechanism and which operates to lower and then to elevate the several stop fingers in succession from left to right to thereby stop the sheet successively in a plurality of different positions such that printing impressions may be formed thereon whenever the sheet is stopped. Such actuation of the several stop fingers 328 is attained by a cam assembly which is mounted in the bearing brackets 387 in such a manner that the cam assembly may be readily removed and replaced when the machine is to be adapted for forming a different number of impressions on each sheet. The cam assembly as herein shown is adapted for use where four successive printing impressions are to be made on each sheet, and comprises a cam shaft 400 disposed parallel to and forwardly of the mounting shaft 386 so as to overlie the forwardly projecting arms 391 of the several stop fingers 328.

The cam shaft 400 is provided with a plurality of cams 401, one for each of the stop fingers 398 which is to be active, and these cams may be of duplicate form disposed in a fixed but angularly displaced relationship upon the cam shaft by a set screw indicated at 402 so as to attain the desired sequence of actuation of the stop fingers.

Each arm 391 has a follower pin 403 projecting laterally therefrom so as to underlie and engage, by gravity, the periphery of the adjacent cam 401. The arrangement is such that when a cam followed pin 403 enters a cam recess 404 the associated stop finger will drop to its lower or active position. After the impression has been made the rotative movement of the cam elevates the associated stop finger 328 and permits the sheet, which has been stopped thereby, to advance beyond this stop finger.

The arrangement is such, that when the first or left-hand stop finger is elevated to release a sheet after the formation of the first printing impression thereon, the second stop finger 328 is in its active position so that the sheet advances until its leading edge strikes the second stop finger. This sequence continues until the last or right-hand stop finger is elevated to thereby release the sheet for discharge movement, and the first or left-hand stop finger 328 is then lowered so as to properly position the next sheet which is fed into the guideway.

The cam shaft 400 is actuated by the sheet separating mechanism. As illustrated in Figs. 3, 4, 5 and 14, the near end of the shaft 233 of the sheet separator mechanism, projects outward beyond the frame plate 90 and carries a mitre gear 405 and a knob 406. The mitre gear 405 coacts with a mitre gear 407 secured to a vertically extending shaft 408 which is journaled in bearings 409 carried by the side plate 344 of the sheet advancing mechanism 14. The arrangement of these gears is such that the gear 405, carried by the separator 12, will swing into and out of engagement with the gear 407, carried by the advancer 14, whenever the sheet separator 12 is swung about its pivot 65 into and out of cooperative relation to the sheet advancer 14. The knob 406 is used to manually tension the gearing to facilitate reengagement of the mitre gears should the small amount of lost motion in the various gears of either mechanism tend to make reengagement difficult.

Secured to the upper end of the shaft 408 is a mitre gear 410 which meshes with a mitre gear 411 secured to a horizontal shaft 412 and extending through an opening 413 in the frame plate 344 of the sheet advancing mechanism. The shaft 412 is mounted at one end in a bearing 414 secured to the frame plate 344 and in suitable other bearings 415 which are secured to the front rail 330 of the advancer mechanism 14. The shaft 412 is coaxial with the cam shaft 400 and is coupled therewith by a suitable releasable coupling unit 416.

The construction of the mitre gearing 405, 407, 410 and 411 is such that when the change speed gearing 234 is in the position shown in Fig. 1 the cam shaft 400 makes one revolution for each revolution of the driving clutch 187. When, however, the change speed gearing is adjusted for quadruple impressions with the gear 374 meshing with the gear 379, the cam shaft 400 will rotate once for each four cycles of operation of the driving clutch 187. Hence the cam shaft 400 always makes one complete revolution for each sheet separated by the sheet separator 12 and advanced to printing position by the sheet advancer 14.

Summary

From the foregoing description it will have become evident that the present invention enables printing machines of this character to utilize an automatic sheet feeding mechanism which includes a sheet separator mechanism and a sheet advancing mechanism for automatic feeding operations, and facilitates the interruption of such automatic operation for brief intervals of manual feeding operations and permits the automatic feeding operation to be resumed without necessitating readjusting the various adjustable elements of the feeding mechanisms. The present invention utilizes a mechanical driving and timing connection between the sheet separating mechanism and the printing mechanism. This connection is so arranged that the separating mechanism may be swung out of and into coacting relation with the sheet advancing means without breaking such driving and timing connection. Such swinging movement renders the sheet separating mechanism readily accessible for the rapid removal of undesired or clogged sheets, and also permits removal of the sheet advancing means without disturbing the correlated adjustments of timing of the other mechanisms. This is an important feature as it is sometimes necessary to remove portions of the table top of the printing machine such as that below the platen mechanism. The present invention renders the table top of the printing machine accessible without severing the driving and timing connections between the sheet separator and the printing machine. The invention is also adapted for multiple impression work at relatively high speeds.

I claim:

1. In a printing apparatus a printer unit to imprint sheets, a sheet advancer unit to advance sheets into and out of printing position, a sheet separator unit to separate sheets from a stack and forward them one at a time to the advancer, an independent supporting frame for each of the units, the advancer supporting frame being separable from both the printer and separator supporting frames for movement to a point remote therefrom, a pivotal connection between the separator supporting frame and the printer supporting frame whereby the separator may be swung to a position out of cooperation with both the advancer and printer, and a permanent timing and driving connection between the printer and separator, and a separable driving connection between the separator and the advancer.

2. A printing apparatus according to claim 1 characterized in that said separable driving connection includes means whereby the connection is automatically separated consequent upon movement of the separator away from the printer and automatically coupled consequent upon movement of the separator into active position relative to the printer.

3. A printing apparatus including a printing mechanism and a sheet feeding mechanism, means to drive the printing mechanism through repeated cycles of operation, said feeding mechanism including a suction foot movable toward and away from contact with the uppermost sheet of a stack of sheets, means to intermittently apply suction to said foot, a driving and timing connection between said printing mechanism and the suction foot, said connection including a manually settable change speed power transmission unit to move said foot toward and away from said stack once during each cycle of operation of the printing mechanism and at a predetermined rate of speed, and settable to cause said suction foot to move toward and away from said stack once during a predetermined number of cycles of operation of the printing mechanism at a slow rate of speed, and an independent power operated means to receive the removed sheet and advance it to the printing mechanism at a high rate of speed.

4. In a printing apparatus, a printer unit to imprint sheets, a sheet advancer unit to advance sheets into and out of printing position, a sheet separator unit having a separating mechanism to separate sheets from a stack and a forwarding means to forward the separated sheets one at a time to the advancer, an independent supporting frame for each of said units, the advancer being separable from both the printer and separator supporting frames for movement to a point remote therefrom, a pivotal connection between the separator supporting frame and the printer supporting frame whereby the separator may be swung to a position out of cooperation with both the printer and advancer, a permanent timing and driving connection between the printer and separator, a separable driving connection between the separator and the advancer, said separator having a set of manually settable change speed gearing operatively connected to be driven by said timing and driving connection, and a driving connection between said gearing and the separating mechanism to cause said mechanism to separate one sheet for each cycle of operation of the printer or to separate one sheet for a predetermined plurality of cycles of operation of the printer as desired.

5. A printing apparatus according to claim 4 wherein the gearing includes a shaft journalled in the frame of the separator and driven by said timing and driving connection, a composite gear member drivingly and slidably mounted on said shaft, a second shaft journalled in said last named separator frame, a plurality of gears secured to said shaft and selectively meshing with said composite gear member as the latter is moved axially by the operator, and means connected with said last named shaft to actuate the separating mechanism.

6. A printing apparatus according to claim 5 in which the gearing operates the separating mechanism at a predetermined rate of speed when set to separate one sheet for each cycle of operation of the printer and at a slower rate of speed when separating a sheet once for a plurality of cycles of operation of the printer, and power mechanism drivingly connected with the separator forwarding means and with the advancer to forward and advance the sheet to printing position at the same rate of speed regardless of the rate of speed of operation of the separating mechanism.

7. A printing apparatus according to claim 6 in which the power operated feeding means includes a motor mounted on the separator frame, and a separable driving connection between said motor and the advancer to drive the advancer at substantially the same rate of speed as the feeding means.

8. In a printing apparatus, a printer unit to imprint sheets, a sheet advancer unit to advance sheets into and out of printing position, a sheet separator unit having a separating mechanism to separate sheets from a stack and means to forward the separated sheets to the advancer unit one at a time, an independent supporting frame for each of said units, the advancer supporting frame being separable from both the printer and the separator supporting frames, a pivotal connection between the separator supporting frame and the printer supporting frame including a pivotally mounted bracket carried by the printer frame for movement about a vertical axis relative thereto, a bar secured at one end to said bracket and extending horizontally outward therefrom, said separator frame being mounted on said bar for horizontal movement relative thereto, means to secure said separator frame to said bar in a selected adjusted position relative thereto to thereby control the distance between the separator and said pivotal connection, a drive shaft journalled at one end in said bracket and extending outward therefrom parallel with said bar, a continuously connected timing and driving connection between said drive shaft and said printer unit, a splined driving connection between said shaft and said separator mechanism whereby the separator may be selectively swung about said pivot shaft for movement into and out of cooperating position relative to the printer and may be selectively moved toward and away from its pivotal connection to alter its relation to the printer when the units are in cooperating positions and continuously maintaining said timing and driving connections.

9. In a printing apparatus, a printer unit to imprint sheets, a sheet advancer unit to advance sheets into and out of printing position, a sheet separator unit having a separating mechanism to separate sheets from a stack and means to forward the separated sheets to the advancer unit one at a time, an independent supporting frame for each of said units, a pivotal connection between the separator supporting frame and the printer supporting frame including a bracket mounted on the printer frame, a vertically extending pivot shaft mounted in said bracket, a second bracket mounted on said shaft for pivotal movement relative to the first named bracket, a bar secured at one end to said second bracket and extending horizontally outward therefrom, said separator frame being mounted for horizontal movement along said bar, means to secure said separator frame to said bar in an adjusted position relative thereto, whereby the distance between the separator and said pivot shaft may be controlled as desired, a gear mounted on said pivot shaft, a driving and timing connection between said gear and said printer, a drive shaft journalled at one end in said second bracket and extending outward therefrom parallel with said bar, a gear journalled in said separator frame and having a splined driving connection with said shaft, a timing and driving connection between said shaft and said separator mechanism, whereby the separator may be selectively swung about the axis of said pivot shaft for movement into and out of cooperating position in relation to the printer and may be selectively moved to and from said pivot shaft to alter the relation of the printer and separator when in their cooperating positions and while constantly maintaining said timing and driving connections.

10. In a printing apparatus, a printer unit to imprint sheets, a sheet advancer unit to advance sheets into and out of printing position, a sheet separator unit having a separating mechanism to separate sheets from a stack and means to forward the separated sheets one at a time to the advancer, an independent supporting frame for each of said units, the advancer being separable from both the printer and separator supporting frames for movement to a point remote therefrom, a pivotal connection between the separator supporting frame and the printer supporting frame whereby the separator may be swung to a position out of cooperation with both the printer and advancer, a permanent timing and driving connection between the printer and separator, a separable driving connection between the separator and the advancer, said separator having a set of manually settable change speed gearing operatively connected to be driven by said timing and driving connection, and a driving connection between said gearing and the separating mechanism to cause said mechanism to separate one sheet for each cycle of operation of the printer or to separate on sheet for a predetermined plurality of cycles of operation of the printer as desired, a sheet stopping mechanism carried by said advancer, and a timing and driving connection between said stopping mechanism and said gears to cause said stopping mechanism to complete one cycle of operation for each sheet separated by the separating mechanism.

LAWRENCE H. MORSE.

REFERENCES CITED

The following references are of record in the file of this patent:

UNITED STATES PATENTS

| Number | Name | Date |
|---|---|---|
| 1,357,459 | Kemper | Nov. 2, 1920 |
| 1,496,454 | Dudley | June 31, 1924 |
| 1,567,362 | Dudley | Dec. 29, 1925 |
| 1,763,598 | Christophel | June 10, 1930 |
| 1,930,511 | Davidson | Oct. 17, 1933 |
| 2,027,797 | Toppin | Jan. 14, 1936 |
| 2,181,211 | Sieg | Nov. 28, 1939 |
| 2,359,852 | Morse | Oct. 10, 1944 |